US012286836B2

(12) United States Patent
Lagarde et al.

(10) Patent No.: US 12,286,836 B2
(45) Date of Patent: Apr. 29, 2025

(54) ELECTROMECHANICAL ACTUATOR FOR BLACKOUT OR SUN-SHADING DEVICE AND BLACKOUT OR SUN-SHADING INSTALLATION COMPRISING SUCH AN ACTUATOR

(71) Applicant: SOMFY ACTIVITES SA, Cluses (FR)

(72) Inventors: Eric Lagarde, Cluses (FR); Norbert Dupielet, Cluses (FR); Thierry Tollance, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 17/785,567

(22) PCT Filed: Dec. 18, 2020

(86) PCT No.: PCT/EP2020/087034
§ 371 (c)(1),
(2) Date: Jun. 15, 2022

(87) PCT Pub. No.: WO2021/123176
PCT Pub. Date: Jun. 24, 2021

(65) Prior Publication Data

US 2023/0009409 A1 Jan. 12, 2023

(30) Foreign Application Priority Data

Dec. 19, 2019 (FR) ........................................ 1915012

(51) Int. Cl.
*E06B 9/322* (2006.01)

(52) U.S. Cl.
CPC ...... *E06B 9/322* (2013.01); *E06B 2009/3222* (2013.01)

(58) Field of Classification Search
CPC . E06B 9/262; E06B 9/32; E06B 9/322; E06B 2009/2622; E06B 2009/2625; E06B 2009/3222
See application file for complete search history.

(56) References Cited

U.S. PATENT DOCUMENTS 5,813,447 A * 9/1998 Lysyj ...................... E06B 9/382 160/84.04
6,338,377 B1 * 1/2002 Domel ...................... E06B 9/32 160/84.02

(Continued)

FOREIGN PATENT DOCUMENTS

CN 103726777 A 4/2014
CN 104302212 A 1/2015

(Continued)

OTHER PUBLICATIONS

International Search Report for PCT/EP2020/087034 mailed Mar. 24, 2021, 5 pages.

(Continued)

*Primary Examiner* — Johnnie A. Shablack
*Assistant Examiner* — Matthew R. Shepherd
(74) *Attorney, Agent, or Firm* — NIXON & VANDERHYE

(57) ABSTRACT

An electromechanical actuator is integrated into a blackout or sun-shading device that includes a screen, top and bottom bars, and top and bottom winding shafts. The screen is between the bars. The top bar is connected to the top winding shaft by first cords. The bottom bar is connected to the bottom winding shaft by second cords. The electromechanical actuator includes first and second transmission devices and an electric motor that drives the shafts. The first transmission device connects to the motor and the top winding shaft and includes a first clutch. The second transmission device connects to the electric motor and the bottom (Continued)

winding shaft and includes a second clutch. When the motor is activated with only one clutch engaged, only one winding shaft is rotated. Moreover, when the motor is activated electrically and the clutches are engaged, the winding shafts are rotated by the motor.

4 Claims, 12 Drawing Sheets

(56) References Cited

U.S. PATENT DOCUMENTS

| | | | | |
|---|---|---|---|---|
| 6,680,594 | B2 * | 1/2004 | Collett | E06B 9/32 318/434 |
| 6,935,398 | B2 * | 8/2005 | Koot | E06B 9/32 160/84.02 |
| 7,063,122 | B2 * | 6/2006 | Colson | E06B 9/262 160/245 |
| 7,143,802 | B2 * | 12/2006 | Strand | E06B 9/60 160/167 R |
| 7,525,277 | B2 * | 4/2009 | Bejean | E06B 9/322 318/16 |
| 7,686,059 | B2 * | 3/2010 | Jarosinski | E06B 9/322 160/171 |
| 8,365,797 | B2 * | 2/2013 | Drew | E06B 9/262 160/84.05 |
| 8,573,281 | B2 * | 11/2013 | Drew | E06B 9/262 160/84.05 |
| 8,720,523 | B2 * | 5/2014 | Nakamura | E06B 9/262 160/167 R |
| 8,830,058 | B2 * | 9/2014 | Yeh | A47H 5/0325 160/310 |
| 9,303,450 | B2 * | 4/2016 | Anderson | E06B 9/322 |
| 9,765,565 | B2 * | 9/2017 | Morris | E06B 9/262 |
| 9,797,188 | B2 * | 10/2017 | Rettig | E06B 9/266 |
| 10,342,103 | B2 * | 7/2019 | Newman, Jr. | G05B 15/02 |
| 10,464,412 | B2 * | 11/2019 | Dudar | B60K 11/085 |
| 10,655,384 | B2 * | 5/2020 | Foley | E06B 9/322 |
| 10,655,387 | B2 * | 5/2020 | Perache | E06B 9/68 |
| 10,871,029 | B2 * | 12/2020 | Ter Haar | E06B 9/325 |
| 10,895,105 | B1 * | 1/2021 | Marchese | E06B 9/322 |
| 11,035,172 | B2 * | 6/2021 | Rieper | E06B 9/322 |
| 11,486,193 | B2 * | 11/2022 | Chiang Huang | E06B 9/322 |
| 2003/0168185 | A1 * | 9/2003 | Wen | E06B 9/304 160/168.1 P |
| 2003/0226644 | A1 | 12/2003 | Koot et al. | |
| 2007/0089838 | A1 * | 4/2007 | Wetsema | E06B 9/322 160/84.06 |
| 2010/0132505 | A1 * | 6/2010 | Hsieh | E06B 9/74 160/310 |
| 2012/0200247 | A1 | 8/2012 | Baugh | |
| 2013/0233496 | A1 * | 9/2013 | Ogden, Jr. | E06B 9/322 160/331 |
| 2013/0248125 | A1 * | 9/2013 | Lin | E06B 9/262 160/331 |
| 2014/0000816 | A1 | 1/2014 | Yeh | |
| 2015/0204136 | A1 * | 7/2015 | Gandhi | E06B 9/322 160/84.02 |
| 2016/0222723 | A1 * | 8/2016 | Morris | E06B 9/322 |
| 2017/0204661 | A1 * | 7/2017 | Dann | E06B 9/322 |
| 2017/0354023 | A1 * | 12/2017 | Dimberg | G05G 1/105 |
| 2018/0080279 | A1 * | 3/2018 | Eubanks, Sr. | E06B 9/38 |
| 2019/0032402 | A1 * | 1/2019 | Ter Haar | E06B 9/322 |
| 2020/0043322 | A1 * | 2/2020 | Nien | G08C 17/00 |
| 2021/0017812 | A1 * | 1/2021 | Cheng | E06B 9/262 |
| 2021/0222488 | A1 * | 7/2021 | Lin | E06B 9/322 |
| 2021/0238920 | A1 * | 8/2021 | Zhang | H02P 23/18 |
| 2021/0340812 | A1 * | 11/2021 | Chiang Huang | E06B 9/322 |
| 2022/0205320 | A1 * | 6/2022 | Chen | E06B 9/76 |
| 2022/0349249 | A1 * | 11/2022 | Henson | E06B 9/322 |

FOREIGN PATENT DOCUMENTS

| | | | | |
|---|---|---|---|---|
| CN | 108463606 A | 8/2018 | | |
| EP | 2 305 943 | 4/2011 | | |
| EP | 3 434 857 | 1/2019 | | |
| EP | 3489452 A1 * | 5/2019 | | E06B 9/262 |
| KR | 10-2018-0137675 | 12/2018 | | |
| WO | 2018/201644 A1 | 11/2018 | | |
| WO | WO-2021123115 A1 * | 6/2021 | | E06B 9/322 |

OTHER PUBLICATIONS

Written Opinion of the ISA for PCT/EP2020/087034 mailed Mar. 24, 2021, 6 pages.

FR Search Report for FR1915012 dated Jul. 9, 2020, 2 pages.

* cited by examiner

ELECTROMECHANICAL ACTUATOR FOR BLACKOUT OR SUN-SHADING DEVICE AND BLACKOUT OR SUN-SHADING INSTALLATION COMPRISING SUCH AN ACTUATOR

This application is the U.S. national phase of International Application No. PCT/EP2020/087034 filed Dec. 18, 2020 which designated the U.S. and claims priority to FR1915012 filed Dec. 19, 2019, the entire contents of each of which are hereby incorporated by reference.

The present invention relates to an electromechanical actuator for a occultation or solar protection device. The present invention also relates to a occultation or solar protection installation comprising such an actuator.

The present invention relates generally to the field of shading devices comprising at least a rail, a screen, a first bar, a second bar and a motorized drive device. The first bar is arranged between the rail and the second bar, in an assembled configuration of the occultation device. The screen is arranged between the first and second bars. The screen is configured to be driven by the motorized drive device to move. The motorized drive device moves, on the one hand, the first bar connected to the screen, between at least one first position and at least one second position, and, on the other hand, the second bar connected to the screen, between at least one third position and at least one fourth position.

Such a motorized drive device comprises at least one electromechanical actuator of an occultation or solar protection element, such as a pleated blind, a honeycomb blind or any other equivalent material, hereinafter called a screen.

It is known to manufacture blinds comprising two bars to regulate the occultation of an opening in a building. This type of blind makes it possible to select the height of the area of the opening to be blacked out, as well as its position within the opening. To do this, it is known to connect each bar to a winding shaft, by means of cords. Each of these winding shafts is motorized by an electromechanical actuator, comprising an electric motor and a gearbox associated respectively to one of the winding shafts. The electromechanical actuator thus comprises two electric motors and two gearboxes. This implies a significant space requirement within an occultation or solar protection installation comprising such an electromechanical actuator, as well as a high manufacturing cost.

The invention intends more particularly to remedy these disadvantages by proposing a more compact and more economical electromechanical actuator for blind.

Document EP 2 305 943 A2 is also known which describes an occultation or solar protection device. The occultation or solar protection device comprises a screen, a bottom bar, a top winding shaft and a bottom winding shaft. The screen is arranged between the top and bottom bars. The top bar is connected to the top winding shaft, by means of first cords, and the bottom bar is connected to the bottom winding shaft, by means of second cords. The occultation or solar protection device further provides for a first electric motor and a first transmission device to be configured to drive the top winding shaft, as well as a second electric motor and a second transmission device to be configured to drive the bottom winding shaft.

Document EP 3 434 857 A1 is also known which describes an occultation or solar protection device. The occultation or solar protection device comprises a screen, a bottom bar, a top winding shaft and a bottom winding shaft. The screen is arranged between the top and bottom bars. The top bar is connected to the top winding shaft, by means of first cords, and the bottom bar is connected to the bottom winding shaft, by means of second cords. The occultation or solar protection device further comprises a first electric motor and a first transmission device configured to drive the top winding shaft, as well as a second electric motor and a second transmission device configured to drive the bottom winding shaft.

To this end, according to a first aspect, the present invention relates to an electromechanical actuator for an occultation or solar protection device,

- the occultation or solar protection device comprising at least:
  - a screen,
  - a top bar,
  - a bottom bar,
  - a top winding shaft, and
  - a bottom winding shaft,
- the screen being arranged between the top and bottom bars,
- the top bar being connected to the top winding shaft, via first cords, and the bottom bar being connected to the bottom winding shaft, via second cords,
- the electromechanical actuator further comprising:
  - a first transmission device, and
  - a second transmission device.

According to the invention, the electromechanical actuator comprises a single electric motor, the electric motor being configured to drive the top and bottom winding shafts. The first transmission device is connected, on the one hand, to the electric motor and, on the other hand, to the top winding shaft. The second transmission device is connected, on the one hand, to the electric motor and, on the other hand, to the bottom winding shaft. The first transmission device comprises a first clutch. The second transmission device comprises a second clutch. When the electric motor is electrically activated and only one of the first and second clutches is engaged, only one of the top and bottom winding shafts is rotated by the electric motor. Furthermore, when the electric motor is electrically activated and the first and second clutches are engaged, the top and bottom winding shafts are rotated by the electric motor.

Thanks to the invention, the presence of a single electric motor within the electromechanical actuator reduces the cost of a motorized drive device for the occultation or solar protection device. This also simplifies integration of the electromechanical actuator into the occultation or solar protection device, as the various electromechanical actuator components are integral with each other.

According to advantageous but non-mandatory aspects of the invention, such an electromechanical actuator comprises one or more of the following features, taken in any technically permissible combination:

- The first transmission device comprises a first encoder. Furthermore, the second transmission device comprises a second encoder.
- The first transmission device comprises a first gearbox, the first gearbox being configured to transmit a movement generated by the electric motor to the top winding shaft. Furthermore, the second transmission device comprises a second gearbox, the second gearbox being configured to transmit a movement generated by the electric motor to the bottom winding shaft.
- Each of the first and second transmission devices comprises one of the first and second clutches, one of the first and second encoders, and one of the first and second gearboxes.

The first transmission device further comprises a first brake. Furthermore, the second transmission device further comprises a second brake.

The top winding shaft is coaxial with the bottom winding shaft.

The top winding shaft is parallel to and not coaxial with the bottom winding shaft. Furthermore, the electromechanical actuator comprises a transmission member, the transmission member being configured to transmit power supplied by the electric motor to at least one of the top and bottom winding shafts.

The first or second clutch or each of the first and second clutches comprises at least:

a housing, a shaft, a coil, a shuttle, and a magnet.

The shaft is connected to an output shaft of the electric motor and is rotatable with respect to the housing. The coil is fixed with respect to the housing. The shuttle is translatable with respect to the housing, between a first position, the first position being an engaged position of the first or second clutch, and a second position, the second position being a disengaged position of the first or second clutch. The magnet is fixed with respect to the shuttle. Furthermore, the coil is configured to generate a pulsating magnetic field, so as to cause the shuttle to move by means of the magnet between the first position and the second position, or vice versa, according to an orientation of the pulsating magnetic field.

The first or second clutch or each of the first and second clutches comprises two magnets with axial magnetization. Furthermore, the two magnets are configured to generate two magnetic fields opposite each other.

The first or second clutch or each of the first and second clutches comprises a magnet with radial magnetization.

In a second aspect, the present invention relates to an occultation or solar protection installation, the installation comprising at least one occultation or solar protection device, the occultation or solar protection device comprising at least:

a screen, a top bar, a bottom bar, a top winding shaft, a bottom winding shaft, and an electromechanical actuator, the screen being arranged between the top and bottom bars, the top bar being connected to the top winding shaft, via first cords, and the bottom bar being connected to the bottom winding shaft, via second cords.

According to the invention, the electromechanical actuator is according to the invention, as mentioned above.

This occultation or solar protection installation provides the same advantages as those mentioned above in relation to the electromechanical actuator of the invention.

According to an advantageous feature of the invention, the electromechanical actuator is configured to move each of the top and bottom bars separately or simultaneously.

According to another advantageous feature of the invention, the installation further comprises at least one control point.

In a first embodiment of the invention, the control point comprises at least:

a housing, a first selection element, a second selection element, and a third selection element, the third selection element being configured to be rotatably or linearly movable with respect to the housing.

The first and second selection elements are configured to control respectively an upward or a downward movement of the bottom bar. Furthermore, the third selection element is configured to control an upward movement and a downward movement of the top bar.

In a second example embodiment, the control point comprises at least:

a housing, a first selection element, a second selection element, and a third selection element, the third selection element being configured to be rotatably or linearly movable with respect to the housing.

The first and second selection elements are configured to control respectively an upward movement and a downward movement of the bottom bar or the top bar.

Furthermore, the third selection element is configured to simultaneously control an upward movement of the top bar and the bottom bar or a downward movement of the top bar and the bottom bar.

In a third embodiment, the control point comprises at least:

a first selection element, a second selection element, a third selection element, the third selection element being configured to activate or deactivate a first operating mode of the installation, and a fourth selection element, the fourth selection element being configured to activate or deactivate a second operating mode of the installation.

When only the first operating mode of the installation is activated, the first and second selection elements are configured to control respectively an upward movement and a downward movement of the top bar. When only the second operating mode of the installation is activated, the first and second selection elements are configured to control respectively an upward movement and a downward movement of the bottom bar. Furthermore, when the first and second operating modes of the installation are simultaneously activated, the first and second selection elements are configured to control respectively an upward movement and a downward movement simultaneously of the top bar and the bottom bar.

The invention will be better understood and other advantages thereof will become clearer in the light of the following description, of three embodiments of an electromechanical actuator and an occultation or solar protection installation according to its principle, given by way of example only and made with reference to the drawings, in which.

Figure 1:
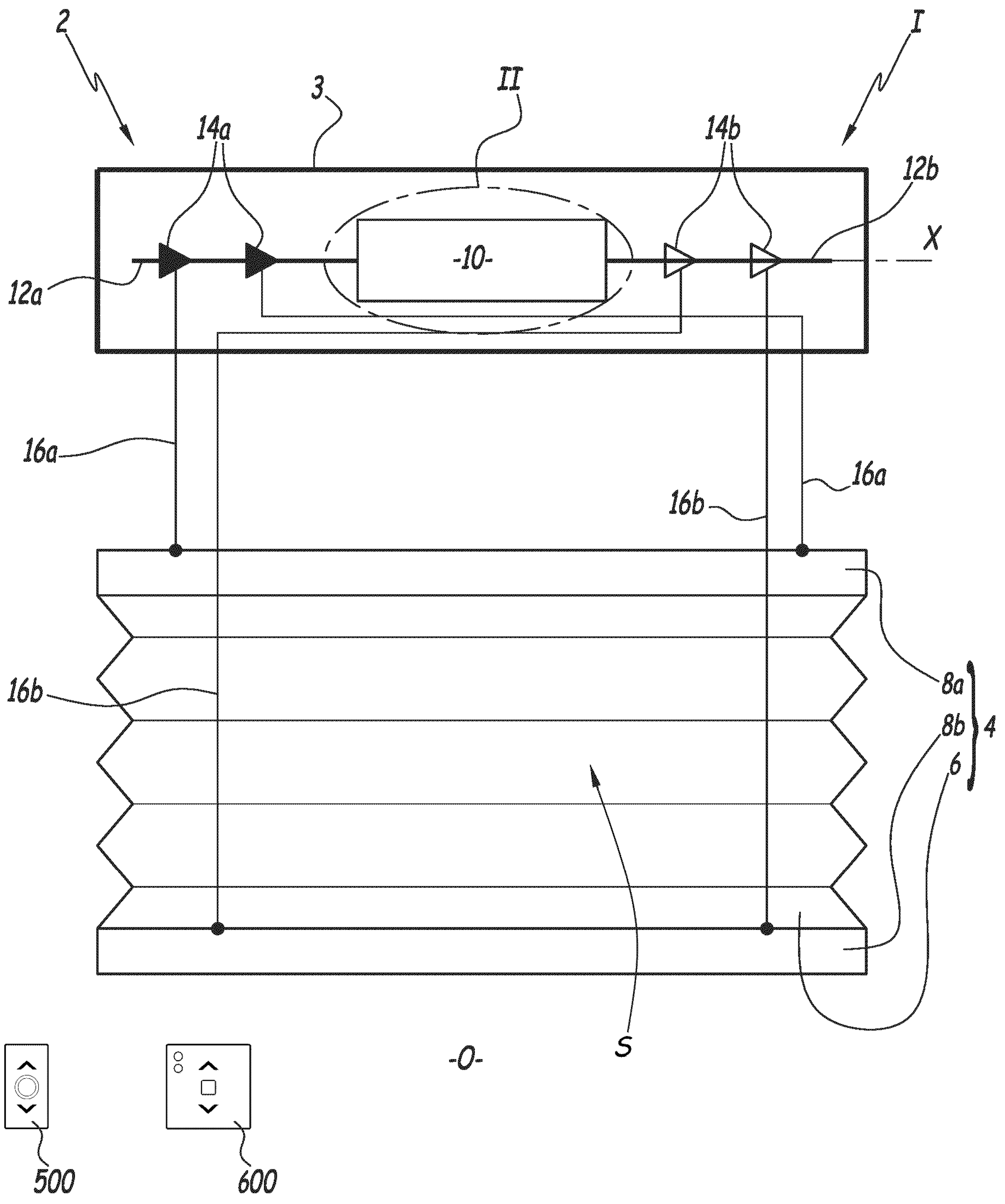
FIG. 1 is a schematic view of an occultation or solar protection installation according to a first embodiment of the invention.
Figure 2:
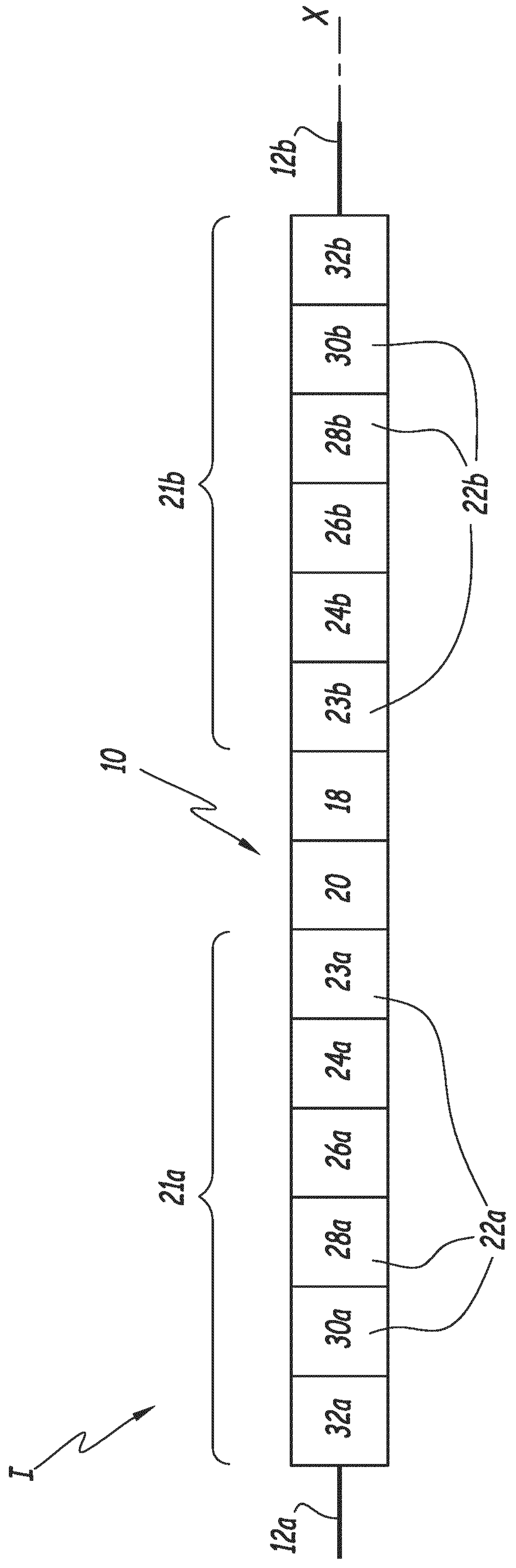
FIG. 2 is a schematic view of an electromechanical actuator according to the first embodiment of the invention, belonging to the installation illustrated in FIG. 1.
Figure 3:
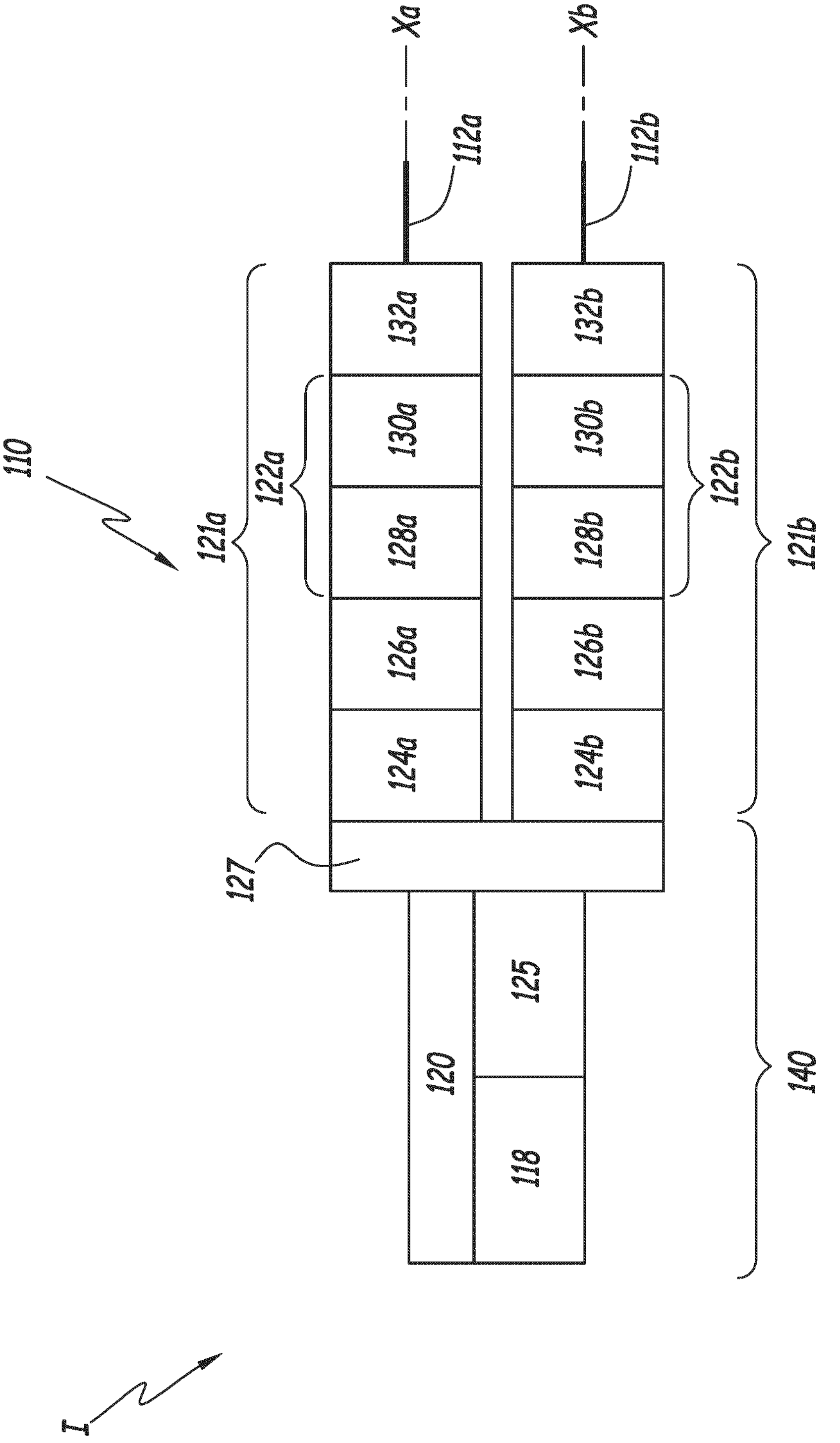
FIG. 3 is a schematic view of an electromechanical actuator according to a second embodiment of the invention, analogous to FIG. 2.
Figure 4:
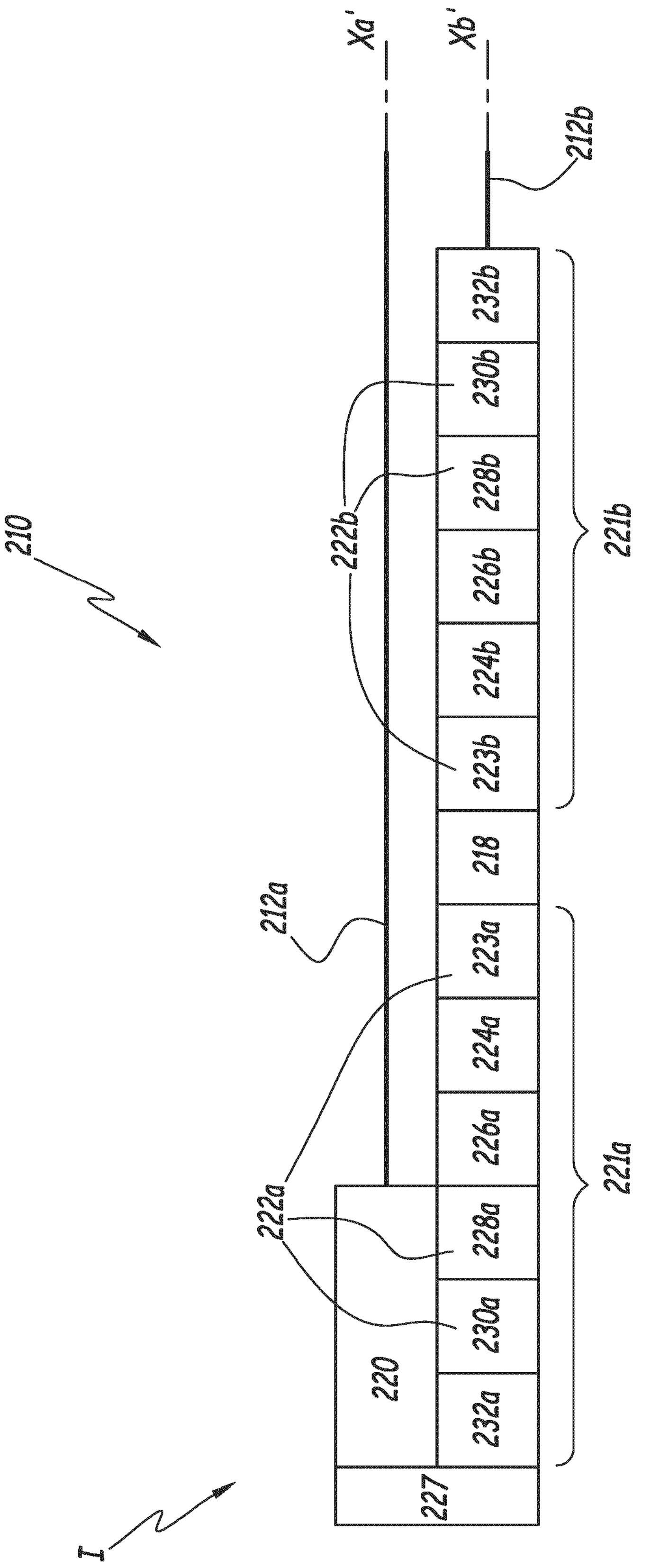
FIG. 4 is a schematic view of an electromechanical actuator according to a third embodiment of the invention, analogous to FIGS. 2 and 3.
Figure 11:
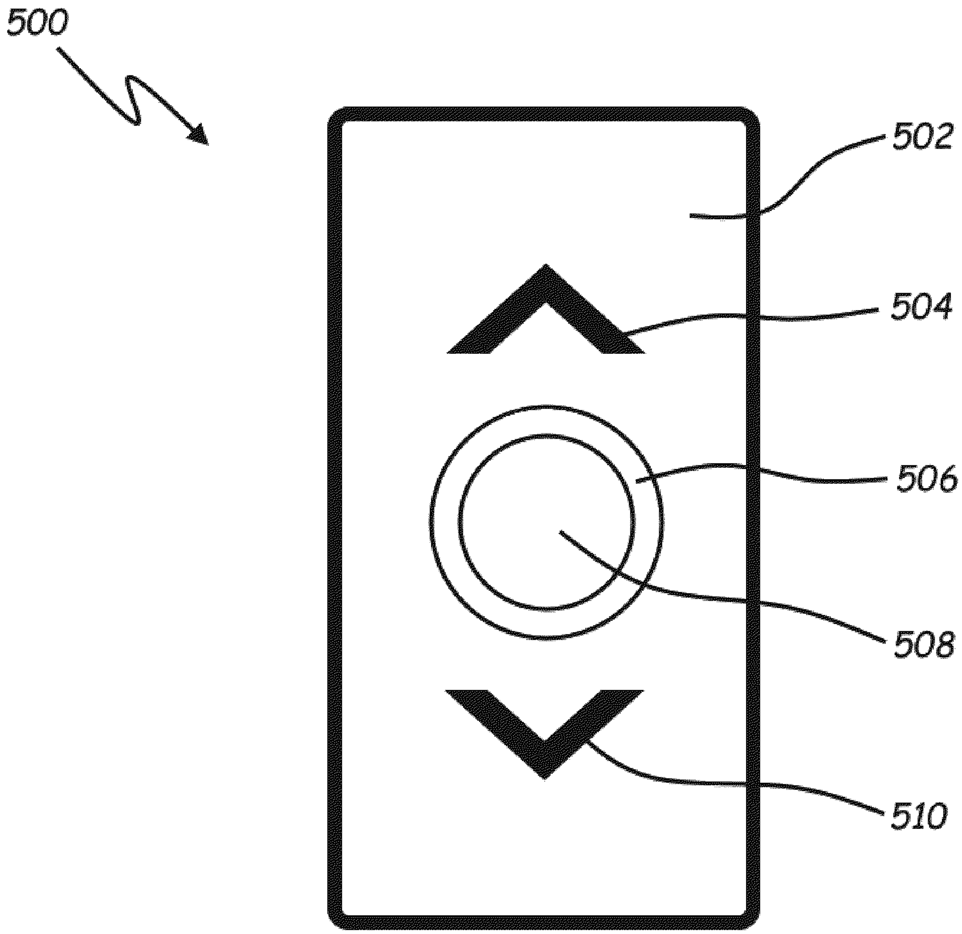
Figure 12:
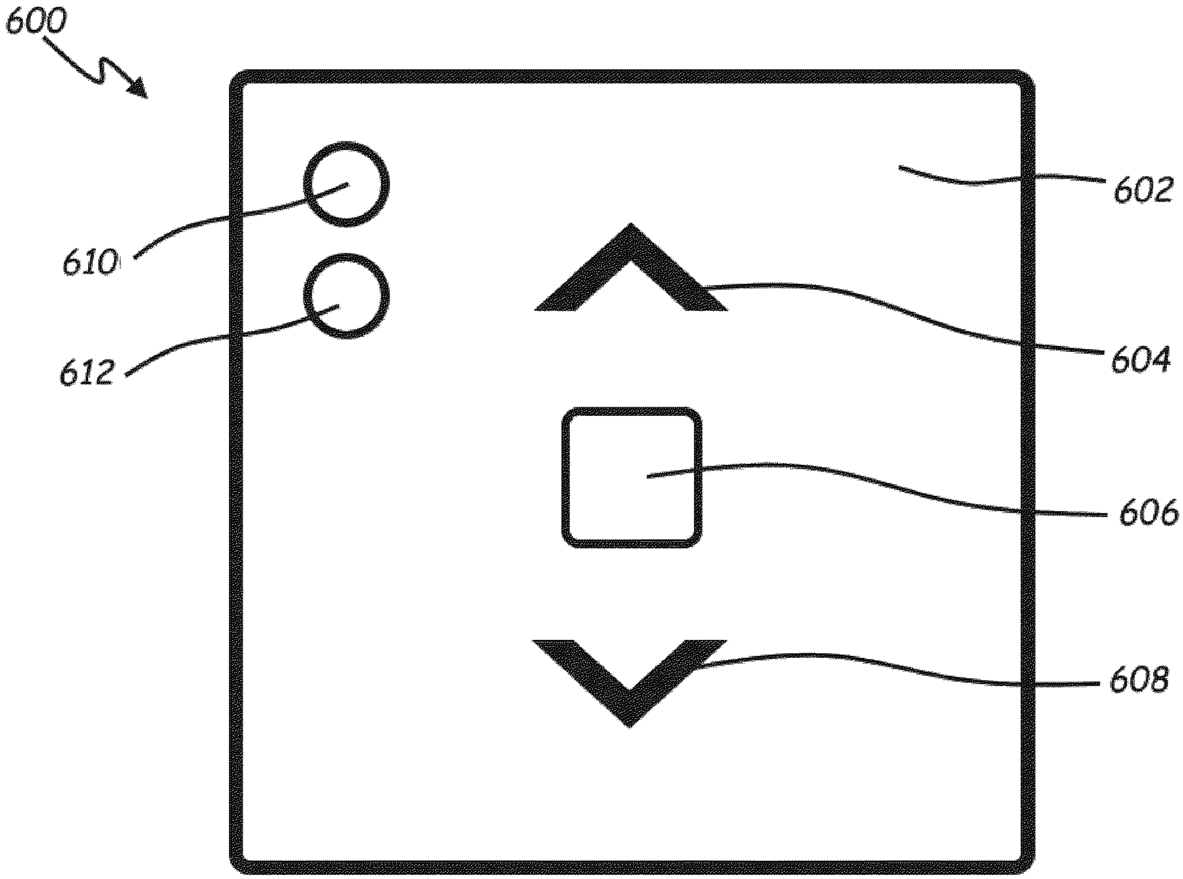

FIG. 11 is a schematic view of a control point belonging to the installation of FIG. 1, according to the invention, and configured to operate with the electromechanical actuator illustrated in one of FIGS. 2 to 4, according to one of the three embodiments of the invention; and FIG. 12 is a schematic view of another control point belonging to the installation of FIG. 1, according to the invention, and configured to operate with the electromechanical actuator illustrated in any of FIGS. 2 to 4, according to one of the three embodiments of the invention.

First we describe, with reference to FIG. 1, an installation I according to a first embodiment of the invention and installed in a building having an opening O, window or door, equipped with a screen 6 belonging to an occultation or solar protection device, in particular a motorized blind.

The occultation or solar protection device is hereinafter referred to as an "occultation device". The occultation device comprises the screen 6.

Here, the installation I comprises the occultation device.

Here, the screen 6 can be formed, for example, from a pleated or honeycombed fabric.

With reference to FIG. 1, a blind according to the first embodiment of the invention is described.

The installation I comprises a drive device 2 of a blind 4 provided for occulting, at least partially, the opening O, such as a window provided in a wall of a building. The motorized drive device 2 comprises an electromechanical actuator 10.

The drive device 2 is housed in a housing 3 of the blind 4 mounted at the top or above the opening O. The housing 3 is generally referred to as a rail and, more particularly, a top rail.

In an assembly mode, not shown, the housing 3 has a U-shaped cross section.

The blind 4 comprises a screen 6. The screen 6 is arranged, in other words is configured to be deployed, between two bars 8*a*, 8*b* of the blind 4, referred to as load bars.

The bars 8*a*, 8*b* comprise a top bar 8*a*, to which a top edge of the screen 6 is connected, and a bottom bar 8*b*, to which a bottom edge of the screen 6 is connected, parallel to the top edge of the screen 6. Thus, the top bar 8*a* is parallel to the bottom bar 8*b*, in an assembled configuration of the installation I.

In the following, elements associated to the top bar 8*a* are noted with an "a" and elements relating to the bottom bar 8*b* are noted with a "b".

The electromechanical actuator 10, centered on an axis X, is configured to rotate two winding shafts 12*a*, 12*b*, belonging to the blind 4.

Here, the winding shafts 12*a*, 12*b* are located on opposite sides of the electromechanical actuator 10, along the axis X, as illustrated in FIGS. 1 and 2.

The winding shafts 12*a*, 12*b* comprise a top winding shaft 12*a* and a bottom winding shaft 12*b*. The top winding shaft 12*a* is dedicated to the movement of the top bar 8*a* and the bottom winding shaft 12*b* is dedicated to the movement of the bottom bar 8*b*. The top and bottom winding shafts 12*a*, 12*b* are coaxial. Moreover, they are parallel with the top and bottom bars 8*a*, 8*b*.

The top winding shaft 12*a* is equipped with two first winding pulleys 14*a*, with each of these first winding pulleys 14*a* being dedicated to wind or unwind a first cord 16*a* attached to the top bar 8*a*. Each of the first cords 16*a* is attached onto the top bar 8*a* in an area near one of the ends of this top bar 8*a*. Similarly, the bottom winding shaft 12*b* is equipped with two second winding pulleys 14*b*, with each of these second winding pulleys 14*b* being dedicated to wind or unwind a second cord 16*b* attached to the bottom bar 8*b*. Each of the second cords 16*b* is attached onto the bottom bar 8*b* in an area near one of the ends of the bottom bar 8*b*. The first and second cords 16*a*, 16*b* connect the top and bottom bars 8*a*, 8*b* to the top and bottom winding shafts 12*a*, 12*b* and thus support the screen 6. When the first or second cords 16*a*, 16*b* wind around the corresponding first or second winding pulleys 14*a*, 14*b*, the corresponding top or bottom bar 8*a*, 8*b* moves up toward the electromechanical actuator 10. Similarly, when the first or second cords 16*a*, 16*b* unwind from the corresponding first or second winding pulleys 14*a*, 14*b*, the top or bottom bar 8*a*, 8*b* moves down away from the housing 3.

The first and second winding pulleys 14*a*, 14*b* are commonly referred to as winders.

The number of first and second winding pulleys associated to the respective top and bottom winding shafts is not limiting and may be different, in particular greater than two.

Advantageously, the first and second winding pulleys 14*a*, 14*b* are arranged inside the housing 3, in an assembled configuration of the blind 4.

The length of the first and second cords 16*a*, 16*b* is provided so that these first and second cords 16*a*, 16*b* are permanently tensioned, while keeping the top and bottom bars 8*a*, 8*b* parallel to each other and parallel to the top and bottom winding shafts 12*a*, 12*b*.

Advantageously, the motorized drive device 2 and, more particularly, the electromechanical actuator 10 is controlled by a control unit 500, 600. The control unit 500, 600 may be, for example, a local command unit, such as the remote control 500 or the wall-mounted control point 600, visible in FIGS. 1, 11 and 12, or a central command unit, not shown.

Advantageously, the local command unit 500, 600 can be connected with the central command unit, in a wired or wireless connection.

Advantageously, the central command unit can control the local command unit 500, 600, as well as other similar local command units distributed in the building.

The motorized drive device 2 is, preferably, configured to execute commands for deploying or retracting the screen 6, which may be emitted, especially, by the local command unit 500, 600 or central command unit.

The installation I comprises either the local command unit 500, 600, or the central command unit, or the local command unit 500, 600 and the central command unit.

The electromechanical actuator 10 according to the first embodiment of the invention is now described in more detail with reference to FIG. 2.

The electromechanical actuator 10 is illustrated schematically in FIG. 2. This electromechanical actuator 10 comprises a single electric motor 18, centered on the axis X.

Means for controlling the electromechanical actuator 10, enabling movement of the screen 6, comprise at least one control unit 20, in particular an electronic control unit. This control unit 20 is adapted to operate the electric motor 18, and, in particular, to enable the supply of electric power to the electric motor 18.

Thus, the control unit 20 controls, especially, the electric motor 18, so as to deploy or fold the screen 6, as previously described.

The means for controlling the electromechanical actuator 10 comprises hardware and/or software means.

As a non-limiting example, the hardware means may comprise at least one microcontroller, not shown.

Advantageously, the control unit 20 further comprises a first communication module, not shown, in particular for receiving command orders, the command orders being emitted by a command transmitter, such as the local command unit 500, 600 or the central command unit, these orders being intended to control the motorized drive device 2.

Preferably, the first communication module of the control unit 20 is wireless. In particular, the first communication module is configured to receive radio command orders.

Advantageously, the first communication module may also make it possible to receive command orders transmitted by wired means.

Advantageously, the control unit 20, the local command unit 500, 600 and/or the central command unit can communicate with a weather station, located inside the building or external to the building, including, especially, one or more sensors that can be configured to determine, for example, temperature, luminosity or wind speed, in the case where the weather station is external to the building.

Advantageously, the control unit 20, the local command unit 500, 600 and/or the central command unit can also communicate with a server, not shown, so as to control the electromechanical actuator 10 according to data made available remotely by means of a communication network, in particular an internet network that can be connected to the server.

The control unit 20 can be controlled from the local command unit 500, 600 or the central command unit. The local command unit 500, 600 or central command unit is provided with a control keyboard. The control keyboard of the local command unit 500, 600 or central command unit comprises one or more selection elements and, optionally, one or more display elements.

By way of non-limiting examples, the selection elements may comprise push buttons and/or touch sensitive keys. The display elements may comprise light-emitting diodes and/or a liquid crystal display (LCD) or thin film transistor (TFT) display. The selection and display elements can also be made by means of a touch screen.

The local command unit 500, 600 or central command unit comprises at least a second communication module.

Thus, the second communication module of the local command unit 500, 600 or central command unit is configured to transmit, in other words emits, command orders, in particular by wireless means, for example by radio, or by wired means.

Furthermore, the second communication module of the local command unit 500, 600 or central command unit may also be configured to receive, in other words receives, command orders, in particular via the same means.

The second communication module of the local command unit 500, 600 or central command unit is configured to communicate, in other words communicates, with the first communication module of the control unit 20.

Thus, the second communication module of the local command unit 500, 600 or central command unit exchanges command orders with the first communication module of the control unit 20, either mono- or bidirectionally.

Advantageously, the local command unit 500, 600 is a control point, which may be fixed 600 or nomadic 500. A fixed control point 600 may be a control box intended to be fixed on a façade of a wall of a building or on a face of a frame of a window or a door. A nomadic control point 500 may be a remote control, a smartphone or a tablet.

Advantageously, the local command unit 500, 600 or central command unit further comprises a controller.

The motorized drive device 2, in particular the control unit 20, is, preferably, configured to execute command orders for moving, especially folding as well as deploying, the screen 6. These command orders can be emitted, especially, by the local command unit 500, 600 or central command unit.

The motorized drive device 2 can be controlled by the user, for example by receiving a command order corresponding to pressing the or one of the selection elements of the local command unit 500, 600 or central command unit.

The motorized drive device 2 may also be controlled automatically, for example, by receiving a command order corresponding to at least one signal from at least one sensor and/or a signal from a clock of the control unit 20, in particular the microcontroller. The sensor and/or the clock may be integrated into the local command unit 500, 600 or central command unit.

Advantageously, the electromechanical actuator 10 may also comprise an end-of-travel position and/or obstacle detection device, which may be mechanical or electronic.

The electromechanical actuator 10 is supplied with electrical energy by an electrical energy supply source, not shown, which may be either a mains power supply network or a battery, which can be recharged, for example, by a photovoltaic panel, not shown.

Here, the electromechanical actuator 10 comprises an electrical power cable, not shown, making it possible to supply it with electrical power from the electrical power supply source.

Advantageously, the electrical power cable may comprise at least one electrical connector, especially one at each end or a single connector at one end. This electrical power cable may be, for example, a cord, in the case where the electromechanical actuator 10 is supplied with electrical power from a mains power supply network, that may have, for example, a 110 V or 230 V supply voltage or a dongle provided with plugs of the RJ 45 type (acronym for "Registered Jack"), in the case where the motorized drive device 17 is supplied with electrical power from an ethernet network.

Here, the control unit 20 is directly connected to the electric motor 18. This control unit 20 is located next to the electric motor 18, along the axis X.

Advantageously, the electromechanical actuator 10 comprises a casing, not shown, in particular a tubular casing. Furthermore, the electric motor 18 is mounted inside the casing, in an assembled configuration of the electromechanical actuator 10. Similarly, the control unit 20 may be mounted within the casing, in the assembled configuration of the electromechanical actuator 10.

The casing of the electromechanical actuator 10 may be, for example, cylindrical in shape, especially revolving or parallelepiped in shape.

In one example embodiment, the casing is made of a metallic material.

The casing material of the electromechanical actuator is not limiting and may be different. It may be, in particular, a plastic material.

The electric motor 18 is configured to rotate, on the one hand, the top winding shaft 12*a* and, on the other hand, the bottom winding shaft 12*b*. The electric motor 18 comprises a first output shaft and a second output shaft, not shown and which extend on one of the two respective sides of the electric motor 18, that is to say on the left and right sides of the electric motor 18 in FIGS. 1 and 2.

The electromechanical actuator 10 further comprises a first transmission device 21*a* and a second transmission device 21*b*. The first transmission device 21*a* is connected, on the one hand, to the electric motor 18 and, on the other hand, to the top winding shaft 12*a*. Furthermore, the second transmission device 21*b* is connected, on the one hand, to the electric motor 18 and, on the other hand, to the bottom winding shaft 12*b*.

Advantageously, the first and second transmission devices 21*a*, 21*b* are mounted inside the casing of the electromechanical actuator 10, in the assembled configuration of the electromechanical actuator 10.

The first transmission device 21*a* comprises a first clutch 24*a*. Furthermore, the second transmission device 21*b* comprises a second clutch 24*b*.

When the electric motor 18 is activated electrically and only one of the first and second clutches 24*a*, 24*b* is engaged, only one of the top and bottom winding shafts 12*a*, 12*b* is rotated by the electric motor 18. Furthermore, when the electric motor 18 is activated electrically and the first and second clutches 24*a*, 24*b* are engaged, the top and bottom winding shafts 12*a*, 12*b* are rotated by the electric motor 18.

Advantageously, the first transmission device 21*a* comprises a first gearbox 22*a*. The first gearbox 22*a* is configured to transmit, in other words transmits, movement generated by the electric motor 18 to the top winding shaft 12*a*. Furthermore, the second transmission device 21*b* comprises a second gearbox 22*b*. The second gearbox 22*b* is configured to transmit movement generated by the electric motor 18 to the bottom winding shaft 12*b*.

Advantageously, the first transmission device 21*a* comprises a first encoder 32*a*. Furthermore, the second transmission device 21*b* comprises a second encoder 32*b*.

Advantageously, the first transmission device 21*a* further comprises a first brake 26*a*. Furthermore, the second transmission device 21*b* further comprises a second brake 26*b*.

By way of non-limiting examples, the first and second brakes 26*a*, 26*b* may be, respectively, a spring brake, a cam brake, an electromagnetic brake or a magnetic brake.

Movement generated by the electric motor 18, at its first output shaft, is transmitted to the top winding shaft 12*a* by the first transmission device 21*a* and, more particularly, by the first gearbox 22*a*.

The first transmission device 21*a* ensures a mechanical connection between the electric motor 18 and the top winding shaft 12*a*. The elements of the first transmission device 21*a* are described below. These elements of the first transmission device 21*a* are aligned, along the axis X, in the order in which they are described below, starting from the electric motor 18 to the top winding shaft 12*a*.

The first transmission device 21*a* comprises a first reduction stage 23*a* of the first gearbox 22*a*, the first clutch 24*a*, the first brake 26*a*, a second reduction stage 28*a* of the first gearbox 22*a*, a third reduction stage 30*a* of the first gearbox 22*a* and the first encoder 32*a*.

The first reduction stage 23*a* of the first gearbox 22*a* is configured to gear down the movement provided by the electric motor 18.

The first clutch 24*a* is configured to be engaged or disengaged, in other words is engaged or disengaged, depending on the user's choice, so as to at least rotatably connect or disconnect the top winding shaft 12*a* to or from the first output shaft of the electric motor 18.

The first brake 26*a* is configured to manage the rotational speed of the top winding shaft 12*a*, especially when the first cords 16*a* are unwound and the top winding shaft 12*a* can be driven by the weight of the blind 4.

The second and third reduction stages 28*a*, 30*a* of the first gearbox 22*a* are configured to gear down the movement provided by the electric motor 18.

The first encoder 32*a*, connected to the top winding shaft 12*a*, is integrated with the first transmission device 21*a*, to avoid any end-of-travel offset that might occur when the clutch is operated by the first clutch 24*a*.

Movement generated by the electric motor 18, at its second output shaft, is transmitted to the bottom winding shaft 12*b* by the second transmission device 21*b* and, more particularly, by the second gearbox 22*b*.

The second transmission device 21*b* ensures a mechanical connection between the electric motor 18 and the bottom winding shaft 12*b*. The elements of the second transmission device 21*b* are similar, or even identical, to the elements of the first transmission device 21*a* connecting the top winding shaft 12*a* to the electric motor 18, in particular through the control unit 20. These elements of the second transmission device 21*b* are aligned, along the axis X, in the order in which they are described below, starting from the electric motor 18 to the bottom winding shaft 12*b*.

The second transmission device 21*b* comprises a first reduction stage 23*b* of the second gearbox 22*b*, the second clutch 24*b*, the second brake 26*b*, a second reduction stage 28*b* of the second gearbox 22*b*, a third reduction stage 30*b* of the second gearbox 22*b* and the second encoder 32*b*.

The functions of these elements 23*b*, 24*b*, 26*b*, 28*b*, 30*b*, 32*b* of the second transmission device 21*b* are the same as those of the elements 23*a*, 24*a*, 26*a*, 28*a*, 30*a*, 32*a* previously described for the first transmission device 21*a*.

The first and second transmission devices 21*a*, 21*b* are arranged on either side of the electric motor 18, along the axis X, that is to say on the two opposite sides of this electric motor 18.

The association of first and second transmission devices 21*a*, 21*b* to a single electric motor 18 makes it possible, with the help of this single electric motor 18 and the control unit 20, to drive the screen 6 of the blind 4, according to several options.

When the first and second clutches 24*a*, 24*b* are engaged and the electric motor 18 is activated electrically, the movement generated by the electric motor 18 is transmitted, through the first and second transmission devices 21*a*, 21*b* and, more particularly, through the first and second gearboxes 22*a*, 22*b*, to the top and bottom winding shafts 12*a*, 12*b*, which are then rotated about the axis X. In this case, the top and bottom bars 8*a*, 8*b* make the same vertical movement simultaneously. This makes it possible to select the position of an area S of the opening O to be blacked out.

When only the first clutch 24*a* is engaged and the electric motor 18 is electrically activated, the movement generated by the electric motor 18 is transmitted by the first transmission device 21*a* and, more particularly, by the first gearbox 22*a* only to the top winding shaft 12*a*. In this case, only the top bar 8*a* moves vertically, while the bottom bar 8*b* remains in position. Thus, the height of the occultation area S is changed with respect to the opening O.

Similarly, when only the second clutch 24*b* is engaged and the electric motor 18 is electrically activated, the movement generated by the electric motor 18 is transmitted by the second transmission device 21*b* and, more particularly, by the second gearbox 22*b* only to the bottom winding shaft 12*b*. In this case, only the bottom bar 8*b* moves vertically, while the top bar 8*a* remains in position. Thus, the height of the occultation area S is changed with respect to the opening O.

The top and bottom bars 8*a*, 8*b* can thus be moved vertically by the electromechanical actuator 10 separately or simultaneously.

Advantageously, the first, second and third reduction stages 23*a*, 23*b*, 28*a*, 28*b*, 30*a*, 30*b* of the first and second gearboxes 22*a*, 22*b* may be epicyclic type gear trains.

The type and number of reduction stages of the first and second gearboxes are not limiting. The number of reduction stages may be, for example, two.

FIG. 3 illustrates an electromechanical actuator 110 according to a second embodiment of the invention, used in a occultation or solar protection installation I. The electromechanical actuator 110 of the second embodiment is functionally similar to the electromechanical actuator 10 of the first embodiment, but differs from it in its structure. The elements of the installation I analogous to those of the first embodiment have thus the same references increased by 100 and operate as explained above. In the following, we describe, mainly, what distinguishes this second embodiment from the first embodiment.

The installation I according to the second embodiment of the invention and the electromechanical actuator 110 are now described, with reference to FIG. 3.

Here, winding shafts 112*a*, 112*b* are located on a same side of the electromechanical actuator 10, as illustrated in FIG. 3.

In this second embodiment, the electromechanical actuator 110 comprises a control block 140. The control block 140 comprises a single electric motor 118 and a control unit 120.

Here, the electric motor 118 comprises a single output shaft, not shown.

Furthermore, first and second gearboxes 122*a*, 122*b* have no first reduction stage. The first reduction stage of the first and second gearboxes 122*a*, 122*b* is replaced by an additional gearbox 125, which may comprise a single reduction stage. The output shaft of the electric motor 118 is connected to the additional gearbox 125. The additional gearbox 125 is configured to gear down movement provided by the electric motor 118, such as the first reduction stage 23*a*, 23*b* of the first and second gearboxes 22*a*, 22*b* of the first embodiment. This movement is then distributed between first and second transmission devices 121*a*, 121*b*, by means of a transmission member 127. The transmission member 127 may be part of the control block 140, as illustrated in FIG. 3.

Movement generated by the electric motor 118, at its output shaft, is transmitted to the top winding shaft 112*a* through the transmission member 127 and the first transmission device 121*a* and, more particularly, through the first gearbox 122*a*.

The first transmission device 121*a* ensures a mechanical connection between the transmission member 127 and the top winding shaft 112*a*. The elements of the first transmission device 121*a* are described next. These elements of the first transmission device 121*a* are aligned, along a first axis Xa, in the order in which they are described below, starting from the transmission member 127 to the top winding shaft 112*a*.

The first transmission device 121*a* comprises a first clutch 124*a*, a first brake 126*a*, a first reduction stage 128*a* of the first gearbox 122*a*, a second reduction stage 130*a* of the first gearbox 122*a* and a first encoder 132*a*.

Movement generated by the electric motor 118, at its output shaft, is transmitted to the bottom winding shaft 112*b* by the transmission member 127 and the second transmission device 121*b* and, more particularly, by the second gearbox 122*b*.

The second transmission device 121*b* ensures a mechanical connection between the transmission member 127 and the bottom winding shaft 112*b*. The elements of the second transmission device 121*b* are similar, or even identical, to the elements of the first transmission device 121*a* connecting the top winding shaft 112*a* to the transmission member 127. These elements of the second transmission device 121*b* are aligned, along a second axis Xb, in the order in which they are described below, starting from the transmission member 127 to the bottom winding shaft 112*b*.

The second transmission device 121*b* comprises a second clutch 124*b*, a second brake 126*b*, a first reduction stage 128*b* of the second gearbox 122*b*, a second reduction stage 130*b* of the second gearbox 122*b* and a second encoder 132*b*.

The first and second axes Xa, Xb are parallel and, in particular, defined by the top and bottom winding shafts 112*a*, 112*b*. Furthermore, the elements 124*b*, 126*b*, 128*b*, 130*b*, 132*b* of the second transmission device 121*b* are positioned so as to face the elements 124*a*, 126*a*, 128*a*, 130*a*, 132*a* of the first transmission device 121*a*, along the first and second axes Xa, Xb.

The transmission member 127, not present in the first embodiment, makes it possible to distribute power supplied by the electric motor 118 to the top and bottom winding shafts 112*a*, 112*b*, which are not coaxial but parallel.

The functions and operation of the other elements 124*a*, 126*a*, 128*a*, 130*a*, 132*a*, 124*b*, 126*b*, 128*b*, 130*b*, 132*b* of the first and second transmission devices 121*a*, 121*b* of the electromechanical actuator 110 of the second embodiment are identical to the functions and operation of the elements 24*a*, 26*a*, 28*a*, 30*a*, 32*a*, 24*b*, 26*b*, 28*b*, 30*b*, 32*b* of the first and second transmission devices 21*a*, 21*b* of the electromechanical actuator 10 of the first embodiment.

The configuration of the electromechanical actuator 110 of the second embodiment allows a space saving in width, in other words parallel to the first and second axes Xa, Xb, as compared to the configuration of the electromechanical actuator 10 of the first embodiment.

In this second embodiment, the vertical movement of the first and second bars 8*a*, 8*b*, similar to those of the first embodiment, may be performed simultaneously or differentially, when the electric motor 118 is electrically activated, depending on whether only one or both clutches 124*a*, 124*b* is or are engaged, so as to rotate either one of the top and bottom winding shafts 112*a*, 112*b* or both the top and bottom winding shafts 112*a*, 112*b*.

The plane in FIG. 3 may be a vertical or a horizontal plane. In other words, the first and second axes Xa, Xb may be offset from each other in a vertical direction, in which case the first transmission device 121*a* is placed above the second transmission device 121*b*, or horizontal, in which case the first transmission device 121*a* is placed at the same height as the second transmission device 121*b* and the first and second transmission devices 121*a*, 121*b* are offset along the width of the housing 3. This plane can be chosen based on the dimension according to which minimizing the space requirement of the drive device 2 is desired.

FIG. 4 illustrates an electromechanical actuator 210 according to a third embodiment of the invention, used in a occultation or solar protection installation I. The electromechanical actuator 210 of the third embodiment is functionally similar to the electromechanical actuator 10 of the first embodiment and to the electromechanical actuator 110 of the second embodiment, but differs from it in its structure. The elements of the installation I analogous to those of the first embodiment thus have the same references increased by 200 and operate as explained above. In the following, we describe, mainly, what distinguishes this third embodiment from the first and second embodiments.

The installation I according to the third embodiment of the invention and the electromechanical actuator 210 are now described, with reference to FIG. 4.

Here, top and bottom winding shafts 212*a*, 212*b* are located on a same side of the electromechanical actuator 210, as in the second embodiment, as illustrated in FIG. 4.

In this third embodiment, the electromechanical actuator 210 comprises a single electric motor 218, a control unit 220, a first transmission device 221*a*, a second transmission device 221*b* and a transmission member 227.

Here, the electric motor 218 comprises two output shafts, not shown. The first transmission device 221*a* is provided to transmit movement generated by the electric motor 218 to the transmission member 227 and to the top winding shaft 212*a*, in particular by means of a first gearbox 222*a*. Furthermore, the second transmission device 221*b* is provided for transmitting the movement generated by the electric motor 218 to the bottom winding shaft 212*b*, in particular through a second gearbox 222*b*.

The first and second transmission devices 221*a*, 221*b* are arranged on either side of the electric motor 218 and their elements 223*a*, 223*b*, 224*a*, 224*b*, 226*a*, 226*b*, 228*a*, 228*b*, 230*a*, 230*b*, 232*a*, 232*b* are aligned along an axis Xb', defined, in particular, by the bottom winding shaft 212*b*.

Furthermore, the electromechanical actuator 210 comprises the transmission member 227, which is a 180° angle gear to redirect the movement transmitted to the first transmission device 221*a* by the electric motor 218 to the top winding shaft 212*a*, an axis Xa' of which is parallel to the axis Xb'. The transmission device 227 thus makes it possible, in this third embodiment, that the bottom winding shaft 212*b* and the top winding shaft 212*a* are parallel.

Movement generated by the electric motor 218, at its first output shaft, is transmitted to the top winding shaft 212*a* by the transmission member 227 and the first transmission device 221*a* and, more particularly, by the first gearbox 222*a*.

The first transmission device 221*a* provides a mechanical connection between the electric motor 218 and the transmission member 227. The elements of the first transmission device 221*a* are described next. These elements of the first transmission device 221*a* are aligned, along the axis Xb', in the order in which they are described below, starting from the electric motor 218 to the transmission member 227.

The first transmission device 221*a* comprises a first reduction stage 223*a* of the first gearbox 222*a*, a first clutch 224*a*, a first brake 226*a*, a second reduction stage 228*a* of the first gearbox 222*a*, a third reduction stage 230*a* of the first gearbox 222*a* and a first encoder 232*a*.

Movement generated by the electric motor 218, at its second output shaft, is transmitted directly to the bottom winding shaft 212*b* by the second transmission device 221*b* and, more particularly, by the second gearbox 222*b*.

The second transmission device 221*b* provides a mechanical connection between the electric motor 218 and the bottom winding shaft 212*b*. The elements of the second transmission device 221*b* are similar, or even identical, to the elements of the first transmission device 221*a* connecting the electric motor 218 to the transmission member 227. These elements of the second transmission device 221*b* are aligned, along the axis Xb', in the order in which they are described below, starting from the electric motor 218 to the bottom winding shaft 212*b*.

The second transmission device 221*b* comprises a first reduction stage 223*b* of the second gearbox 222*b*, a second clutch 224*b*, a second brake 226*b*, a second reduction stage 228*b* of the second gearbox 222*b*, a third reduction stage 230*b* of the second gearbox 222*b* and a second encoder 232*b*.

The functions and operation of the other elements 223*a*, 224*a*, 226*a*, 228*a*, 230*a*, 232*a*, 223*b*, 224*b*, 226*b*, 228*b*, 230*b*, 232*b* of the first and second transmission devices 221*a*, 221*b* of the electromechanical actuator 210 of the third embodiment are identical to the functions and operation of elements 23*a*, 24*a*, 26*a*, 28*a*, 30*a*, 32*a*, 23*b*, 24*b*, 26*b*, 28*b*, 30*b*, 32*b* of the first and second transmission devices 21*a*, 21*b* of the electromechanical actuator 10 of the first embodiment and to those of the elements 124*a*, 126*a*, 128*a*, 130*a*, 132*a*, 124*b*, 126*b*, 128*b*, 130*b*, 132*b* of the first and second transmission devices 121*a*, 121*b* of the electromechanical actuator 110 of the second embodiment.

In this third embodiment, the vertical movement of the first and second bars 8*a*, 8*b*, similar to those of the first embodiment, may be performed simultaneously or differentially, when the electric motor 218 is electrically activated, depending on whether only one or both of the clutches 224*a*, 224*b* is or are engaged, so as to rotate one of the top and bottom winding shafts 212*a*, 212*b* or both of the top and bottom winding shafts 212*a*, 212*b*.

In a variant, not shown, in the first embodiment, the control unit 20 is located, along the axis X, adjacent to the electric motor 18 toward the bottom winding shaft 12*b*.

Regardless of the embodiment, the engagement and disengagement of the first and second clutches 24*a*, 24*b*, 124*a*, 124*b*, 224*a*, 224*b* is controlled by means of the control unit 20, 120, 220.

"Engaging", in other words "clutching", means implementing a clutch, at the level of each of the first and second clutches 24*a*, 24*b*, 124*a*, 124*b*, 224*a*, 224*b*, to couple its input and its output mechanically and to cause a rotational movement between this input and this output. "Disengaging", in other words "de-clutching", means implementing disengagement, at each of the first and second clutches 24*a*, 24*b*, 124*a*, 124*b*, 224*a*, 224*b*, to decouple its input and its output and not cause a movement between this input and this output.

A first example embodiment of a clutch is now described, in more detail with reference to FIGS. 5 through 8, which may, optionally, be either or both of the first and second clutches 24*a*, 24*b*, 124*a*, 124*b*, 224*a*, 224*b* or each of the first and second clutches 24*a*, 24*b*, 124*a*, 124*b*, 224*a*, 224*b*, illustrated in FIGS. 2 through 4.

The clutch 24*a*, 24*b*, 124*a*, 124*b*, 224*a*, 224*b* comprises a housing 300.

Figure 5:
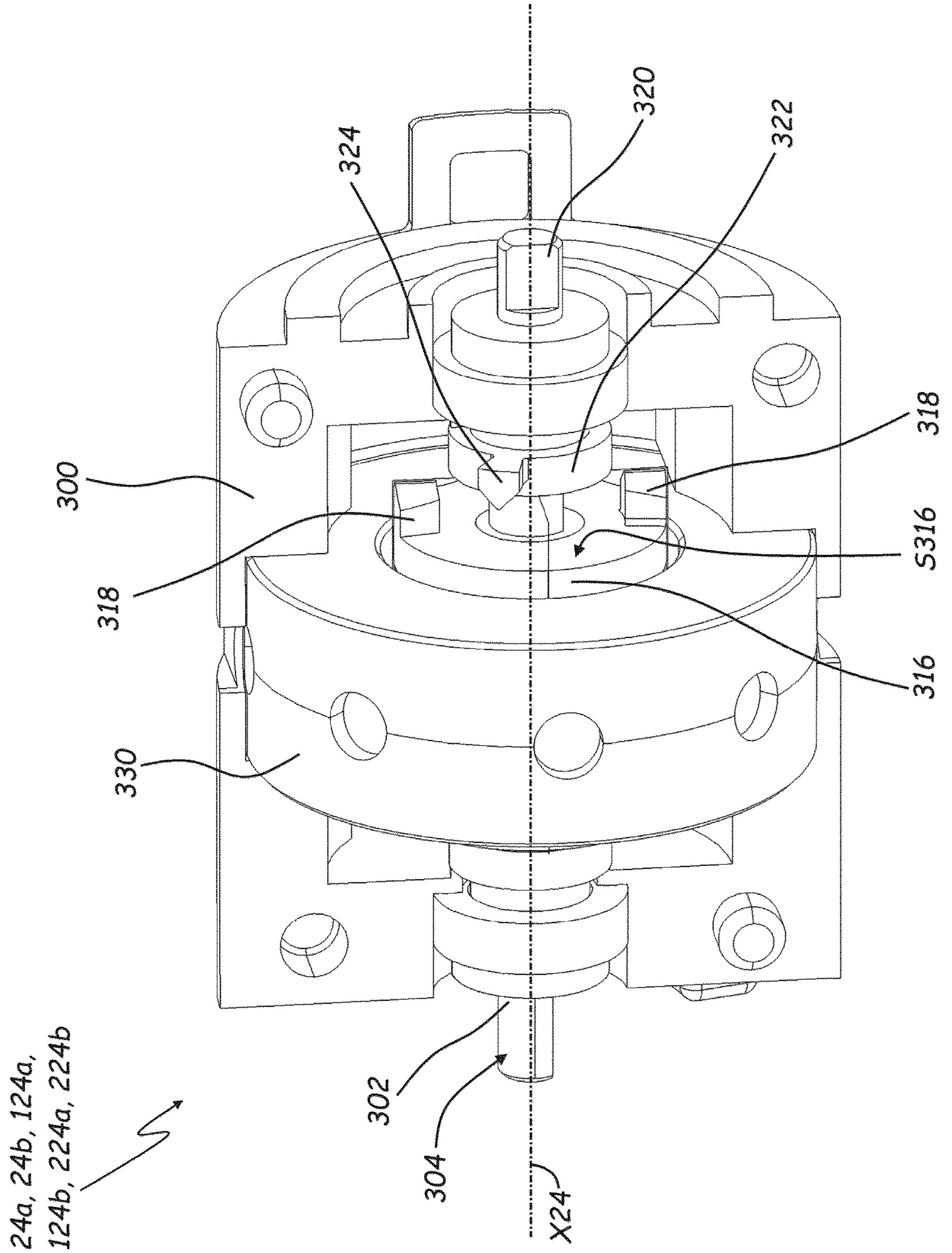
FIG. 5 is a first perspective view of a clutch, according to a first embodiment of the invention, of the electromechanical actuator illustrated in one of FIGS. 2 to 4, according to one of the three embodiments of the invention.
Figure 6:
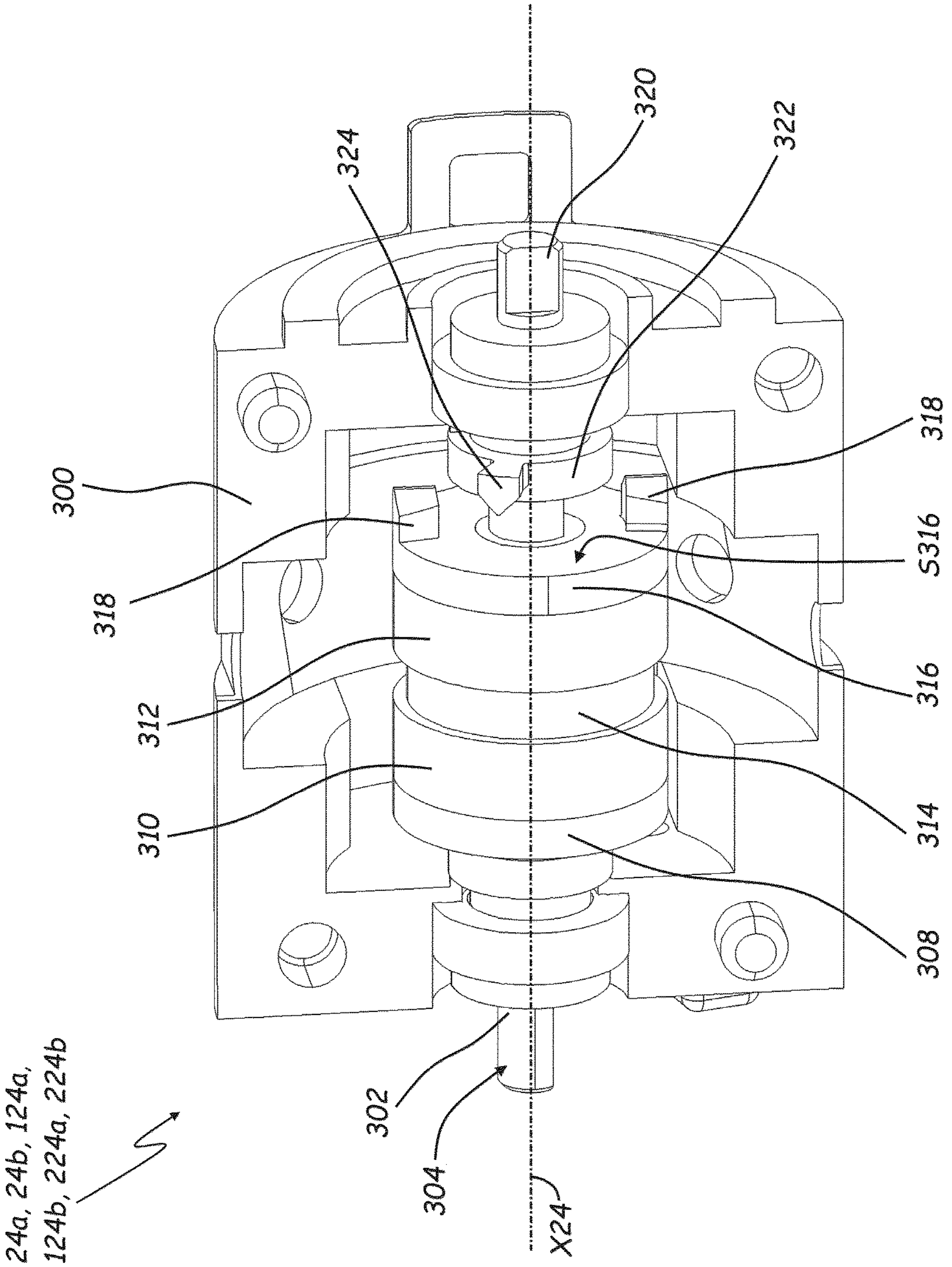
FIG. 6 is a second perspective view of the clutch illustrated in FIG. 5, where a coil is omitted.

Here, the housing 300 comprises two housing halves, only one of which is illustrated in FIGS. 5 and 6, for ease of reading these Figures.

The clutch 24*a*, 24*b*, 124*a*, 124*b*, 224*a*, 224*b* comprises a shaft 302. Furthermore, the shaft 302 is connected, in other words is configured to be connected, to either the first or second output shafts or the output shaft of the electric motor 18, 118, 218 and is rotatable, in other words is configured to be rotatable, with respect to the housing 300, in particular in an assembled configuration of the clutch 24*a*, 24*b*, 124*a*, 124*b*, 224*a*, 224*b*.

Here, the shaft 302 is centered on an axis X24, in particular in the assembled configuration of the clutch 24*a*, 24*b*, 124*a*, 124*b*, 224*a*, 224*b*.

Advantageously, the shaft 302 comprises an input 304. Furthermore, the input 304 is rotated, in other words is configured to be rotated, respectively by first output shaft or the output shaft of the electric motor 18, 118, 218 and, optionally, via the first reduction stage 23*a*, 223*a*, when the clutch forms the first clutch 24*a*, 124*a*, 224*a*, and by the second output shaft or by the output shaft of the electric motor 18, 118, 218 and, optionally, via the first reduction stage 23*b*, 223*b*, when the clutch forms the second clutch 24*b*, 124*b*, 224*b*.

Here, the input 304 constitutes a first end of the shaft 302. Furthermore, the shaft 302 also has a second end 305. The second end 305 is opposite the first end 304 of the shaft 302.

Figure 7:
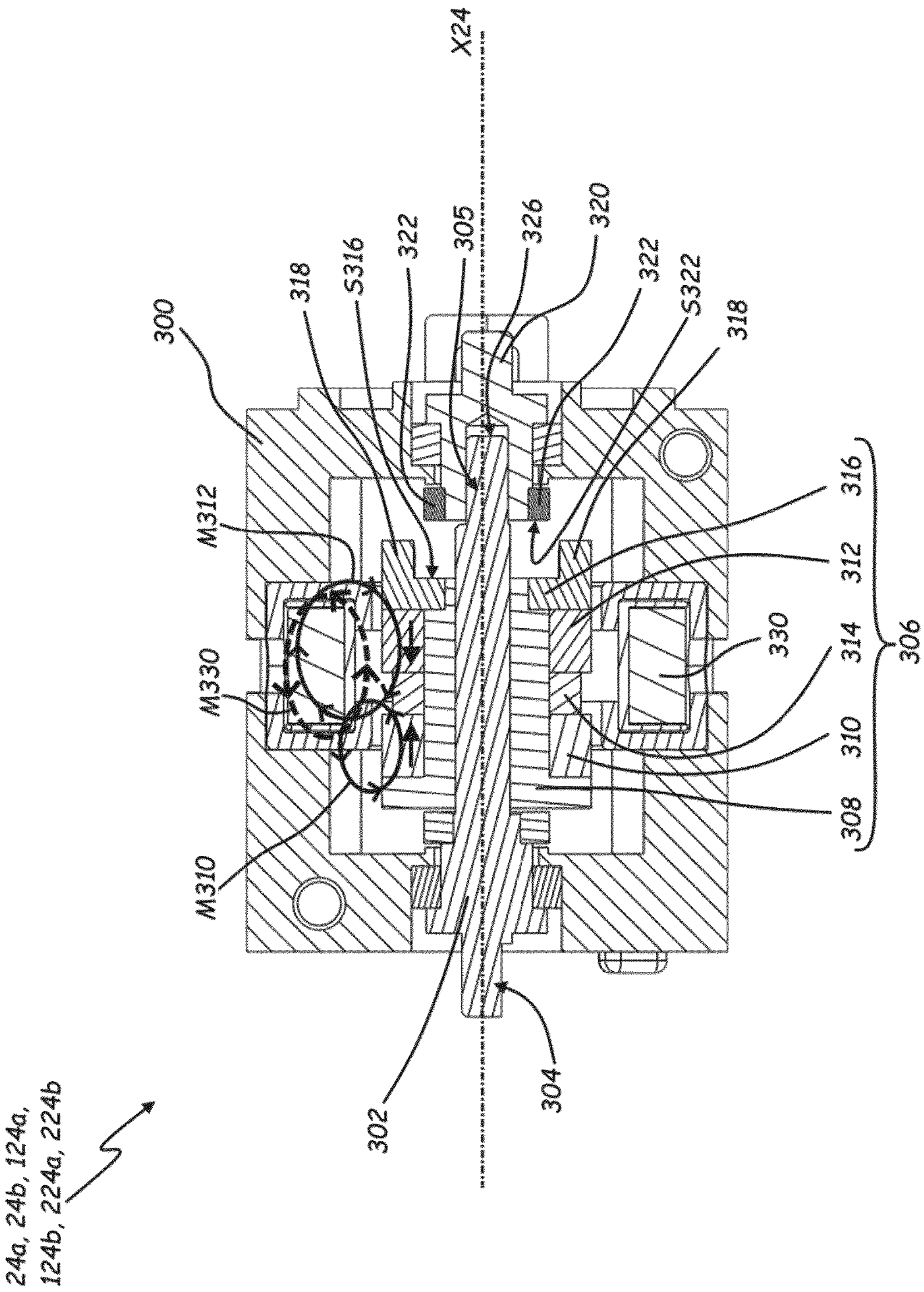
FIG. 7 is a schematic cross-sectional view of the clutch illustrated in FIGS. 5 and 6, in a position called "disengaged" of the clutch, according to a sectional plane passing through an axis of the clutch.
Figure 8:
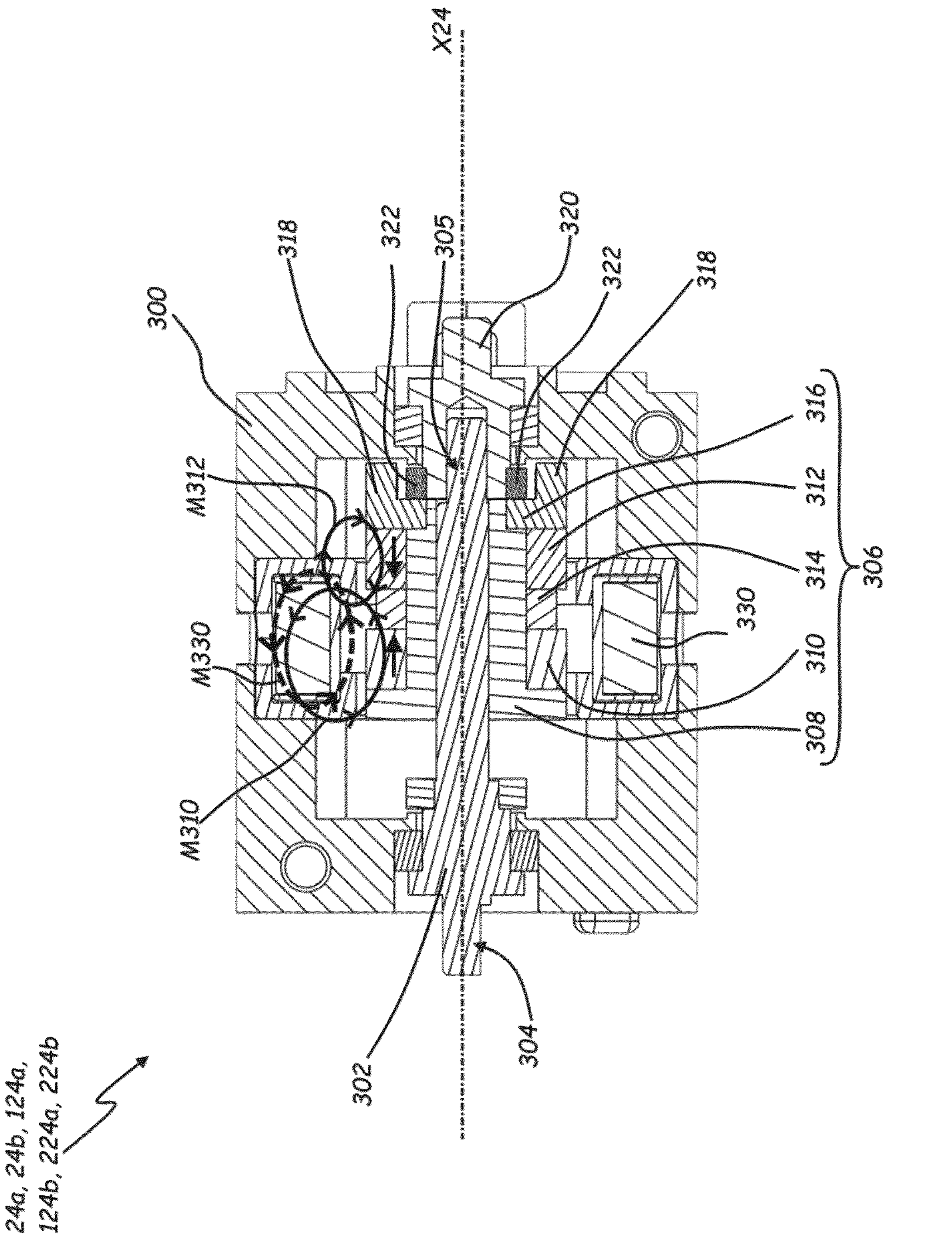
FIG. 8 is a view similar to FIG. 7, in a position called "engaged" of the clutch.

The clutch 24*a*, 24*b*, 124*a*, 124*b*, 224*a*, 224*b* further comprises a shuttle 306, illustrated in FIGS. 7 and 8.

Here, the shuttle 306 is mounted on the shaft 302, in particular in the assembled configuration of the clutch 24*a*, 24*b*, 124*a*, 124*b*, 224*a*, 224*b*. Furthermore, the shuttle 306 is translatable with respect to the shaft 302, along the axis X24, and fixed rotationally with respect to the shaft 302.

The clutch 24*a*, 24*b*, 124*a*, 124*b*, 224*a*, 224*b* further comprises at least one magnet 310, 312.

Here, the clutch 24*a*, 24*b*, 124*a*, 124*b*, 224*a*, 224*b* comprises a first magnet 310 and a second magnet 312. Furthermore, each of the first and second magnets 310, 312 is configured to generate, in other words generates, a magnetic field, respectively denoted M310 and M312, simplified embodiments of which are illustrated in FIGS. 7 and 8.

Each of the first and second magnets 310, 312 is fixed with respect to the shuttle 306, in particular in the assembled configuration of the clutch 24*a*, 24*b*, 124*a*, 124*b*, 224*a*.

Advantageously, the shuttle 306 comprises at least one ring 308, the first magnet 310, the second magnet 312, a spacer 314, and a first claw 316.

Here, the elements 308, 310, 312, 314, 316 of the shuttle 306 are all fixed to each other.

Here, the first claw 316 of the shuttle 306 is said to be "mobile".

Here, the first and second magnets 310, 312 are axially magnetized magnets, which may be, for example, ring-shaped.

Advantageously, each of the first and second magnets 310, 312 is mounted on the ring 308 of the shuttle 306, in particular in the assembled configuration of the clutch 24*a*, 24*b*, 124*a*, 124*b*, 224*a*, 224*b*.

Here, the axis of symmetry of each of the first and second magnets 310, 312 is coincident with the axis X24.

Advantageously, each of the first and second magnets 310, 312 is separated by a fixed distance by means of the spacer 314.

Advantageously, the first and second magnets 310, 312 are oriented so that their magnetic fields M310, M312 are opposite.

Here and as illustrated in FIGS. 5 to 8, the first claw 316 defines a contact surface S316, the normal of which is parallel to the axis X24, in particular in the assembled configuration of the clutch 24*a*, 24*b*, 124*a*, 124*b*, 224*a*.

Advantageously, the first claw 316 comprises at least a first tooth 318.

Here and as illustrated in FIGS. 5 through 8, the first claw 316 comprises two first teeth 318.

Advantageously, the clutch 24*a*, 24*b*, 124*a*, 124*b*, 224*a* comprises an output 320. Furthermore, the output 320 is connected, that is to say integral, in other words is configured to be connected or to be integral, respectively to the top winding shaft 12*a* via the second and third reduction stages 28*a*, 30*a*, when the clutch forms the first clutch 24*a*, 124*a*, 224*a*, and to the bottom winding shaft 12*b* via the second and third reduction stages 28*b*, 30*b*, when the clutch forms the second clutch 24*b*, 124*b*, 224*b*.

Advantageously, the outlet 320 comprises at least one second claw 322.

Here, the second claw 322 is said to be "fixed", since it is fixed in translation along the axis X24, unlike the first claw 316 which is said to be "mobile".

Advantageously, the second claw 322 comprises at least one second tooth 324.

Here, the second claw 322 comprises two second teeth 324, only one of which is visible in FIGS. 5 and 6, in particular in the assembled configuration of the clutch 24*a*, 24*b*, 124*a*, 124*b*, 224*a*.

Here and as illustrated in FIG. 7, the second claw 322 defines a contact surface S322, whose normal is parallel to the axis X24.

In a variant, not shown, each of the first and second claws 316, 322 comprises a number of teeth 318, 324 different than two, which may be, for example, one, three, or four. The number of second teeth 324 is, preferably, equal to the number of first teeth 318.

Here, the outlet 320 and the second claw 322 are rotatable about the axis X24, in particular in the assembled configuration of the clutch 24*a*, 24*b*, 124*a*, 124*b*, 224*a*.

Advantageously, the outlet 320 further comprises a bore 326. Furthermore, the second end 305 of the shaft 302 is housed within the bore 326 of the outlet 320, in particular in the assembled configuration of the clutch 24*a*, 24*b*, 124*a*, 124*b*, 224*a*.

Here, the second end 305 of the shaft 302 is rotatable within the bore 326 with respect to the output 320.

Thus, the second end 305 of the shaft 302 is held in place by the bore 326 but does not rotate the output 320.

The clutch 24*a*, 24*b*, 124*a*, 124*b*, 224*a* further comprises a coil 330, as illustrated in FIGS. 5, 7 and 8, which may be, for example, ring-shaped.

Advantageously, the coil 300 is fixed with respect to the housing 300, that is to say is arranged fixedly within the housing 300, in particular in the assembled configuration of the clutch 24*a*, 24*b*, 124*a*, 124*b*, 224*a*.

Here, the axis of symmetry of the coil 300 is coincident with the axis X24.

Advantageously, the shuttle 306 is housed, in other words is configured to be housed, in a central space of the coil 330, in particular in the assembled configuration of the clutch 24*a*, 24*b*, 124*a*, 124*b*, 224*a*.

The shuttle 306 is translatable, in other words is configured to be translatable, with respect to the housing 300, in particular along the axis X24, between a first position and a second position, in particular in the assembled configuration of the clutch 24*a*, 24*b*, 124*a*, 124*b*, 224*a*. The first position is an engaged position, in other words a "clawed" position, of the clutch 24*a*, 24*b*, 124*a*, 124*b*, 224*a*, 224*b*. Furthermore, the second position is a disengaged position, in other words an "un-clawed" position, of the clutch 24*a*, 24*b*, 124*a*, 124*b*, 224*a*, 224*b*.

The coil 330 is configured to generate, in other words generates, a pulsating magnetic field M330, a simplified representation of which can be seen in FIGS. 7 and 8, in particular when powered by an electric current from a generator, not shown, so as to cause the shuttle 306 to move by means of the first and second magnets 310, 312, between the first position and the second position, or vice versa, based on the orientation of the pulsating magnetic field M330.

In FIGS. 7 and 8, the pulsating magnetic field M330 is illustrated oriented according to a first polarity, which depends on the direction of flow of the electric current. When the direction of flow of the electric current is reversed, then the polarity of the pulsating magnetic field M330 is reversed, that is to say that the field lines of the pulsating magnetic field M330 are identical but their orientation is reversed.

The second position of the clutch 24*a*, 24*b*, 124*a*, 124*b*, 224*a*, 224*b* is illustrated in FIGS. 5 through 7. In this second position, the first claw 316 is not in contact with the second claw 322.

Thus, the shaft 302 does not rotate the output 320 of the clutch 24*a*, 24*b*, 124*a*, 124*b*, 224*a*, 224*b*. In other words, the input 304 and the output 320 of the clutch 24*a*, 24*b*, 124*a*, 124*b*, 224*a*, 224*b* are decoupled and the clutch 24*a*, 24*b*, 124*a*, 124*b*, 224*a*, 224*b* does not transmit movement between its input 304 and its output 320.

In the second position of the clutch 24*a*, 24*b*, 124*a*, 124*b*, 224*a*, 224*b*, the second magnet 312 is closer to the coil 330 than the first magnet 310.

Thus, the magnetic field M312 of the second magnet 312 is in opposition to the pulsating magnetic field M330 of the coil 330. The magnetic field M310 of the first magnet 310 and the pulsating magnetic field M330 of the coil 330 can couple if the shuttle 306 moves due to the opposition of the magnetic field M312 of the second magnet 312 with the pulsating magnetic field M330 of the coil 330. This is illustrated in FIG. 7 where the direction of the magnetic field circuits are illustrated by arrows.

The first position of the shuttle 306 is illustrated in FIG. 8. In this first position, the first claw 316 is engaged with the second claw 322, that is to say that the first and second claws 316, 322 are in contact. In other words, in this first position, the contact surface S316 of the first claw 316 is in contact with the contact surface S322 of the second claw 322.

Furthermore, in the first position of the shuttle 306, the rotation of the shaft 302 is transmitted to the output 320 of the clutch 24*a*, 24*b*, 124*a*, 124*b*, 224*a*, 224*b*.

Thus, when the shaft 302 is rotated, the first teeth 318 of the first claw 316 are rotated, until they are in contact with the second teeth 324 of the second claw 322.

Once the first and second teeth 318, 324 are in contact, the second claw 324 is rotated by the first claw 318.

Thus, the input 304 and the output 320 of the clutch 24*a*, 24*b*, 124*a*, 124*b*, 224*a*, 224*b* are mechanically coupled and the clutch 24*a*, 24*b*, 124*a*, 124*b*, 224*a*, 224*b* transmits a rotational movement between its input 304 and its output 320.

In the first position of the clutch 24*a*, 24*b*, 124*a*, 124*b*, 224*a*, 224*b*, the first magnet 310 is closer to the coil 330 than the second magnet 312.

Thus, the magnetic field M310 of the first magnet 310 is coupled with the pulsating magnetic field M330 of the coil 330. The magnetic field M312 of the second magnet 312 and the pulsating magnetic field M330 of the coil 330 are also coupled over a small portion of their respective circuit. This is illustrated in FIG. 8 where the direction pf the circuits of the magnetic fields are illustrated by arrows.

In the absence of the pulsating magnetic field M330 generated by the coil 330, the first position and the second position of the clutch 24*a*, 24*b*, 124*a*, 124*b*, 224*a*, 224*b* are stable positions, that is to say nothing causes the clutch 24*a*, 24*b*, 124*a*, 124*b*, 224*a*, 224*b* to switch from one position to another.

In other words, the first and second clutches 24*a*, 24*b*, 124*a*, 124*b*, 224*a*, 224*b* are bistable clutches.

To switch between the second position and the first position of the clutch 24*a*, 24*b*, 124*a*, 124*b*, 224*a*, 224*b*, the coil 330 is supplied with a first electric current so as to generate the pulsating magnetic field M330 in a first orientation, as illustrated in FIGS. 7 and 8.

When the coil 330 generates the pulsating magnetic field M330 in the first orientation and the clutch 24*a*, 24*b*, 124*a*, 124*b*, 224*a*, 224*b* is in the second position, the pulsating magnetic field M330 of the coil 330 and the magnetic field M312 of the second magnet 312 are opposite, that is to say they have two opposite orientations.

This opposition leads to the coil 330, which is fixed, pushing the second magnet 312, which is translatable along the axis X24.

Thus, the second magnet 312 is set in movement along axis X24, so as to drive the entire shuttle 306. This translation continues until the contact surface S316 of the first claw 316 and the contact surface S322 of the second claw 322 come into contact, that is to say until the shuttle 306 is in the first position.

Furthermore, between the second position and the first position, the pulse magnetic field M330 of the coil 330 and the magnetic field M310 of the first magnet 310 are aligned, that is to say they have the same orientation.

This alignment leads to the coil 330 attracting the first magnet 310, so as to drive the entire shuttle 306 to the first position.

Since the first position is a stable position of the clutch 24*a*, 24*b*, 124*a*, 124*b*, 224*a*, 224*b*, once this switching is done, the power supply to the coil 330 is interrupted. In other words, an electrical pulse, that generates a pulsating magnetic field M330, is all that is required to switch from the disengaged to the engaged state.

To switch between the first position and the second position of the clutch 24*a*, 24*b*, 124*a*, 124*b*, 224*a*, 224*b*, the coil 330 is supplied with a second electric current, of opposite intensity to the first electric current, so as to generate a pulsating magnetic field M330 according to a second orientation, opposite to the first orientation, not shown.

In other words, if for example the first electric current has a positive intensity, then the second electric current has a negative intensity.

Thus, the pulsating magnetic field M330 generated by this second electric current is opposite the magnetic field M310 of the first magnet 310 and aligned with the magnetic field M312 of the second magnet 312.

This alignment leads to the coil 330 pushing the first magnet 310 away and attracting the second magnet 312, so as to drive the entire shuttle 306 to the second position.

Thus, switching between the first and second position of the clutch 24*a*, 24*b*, 124*a*, 124*b*, 224*a*, 224*b* occurs according to the same phenomena as the switching between the second position and the first position of the clutch 24*a*, 24*b*, 124*a*, 124*b*, 224*a*, 224*b*, but in reverse.

Since the second position is a stable position of the clutch 24*a*, 24*b*, 124*a*, 124*b*, 224*a*, 224*b*, once this switching is done, the power supply to the coil 330 is interrupted. In other words, an electrical pulse, that generates a pulsating magnetic field M330, is all that is required to switch from the engaged to the disengaged state.

Figure 9:
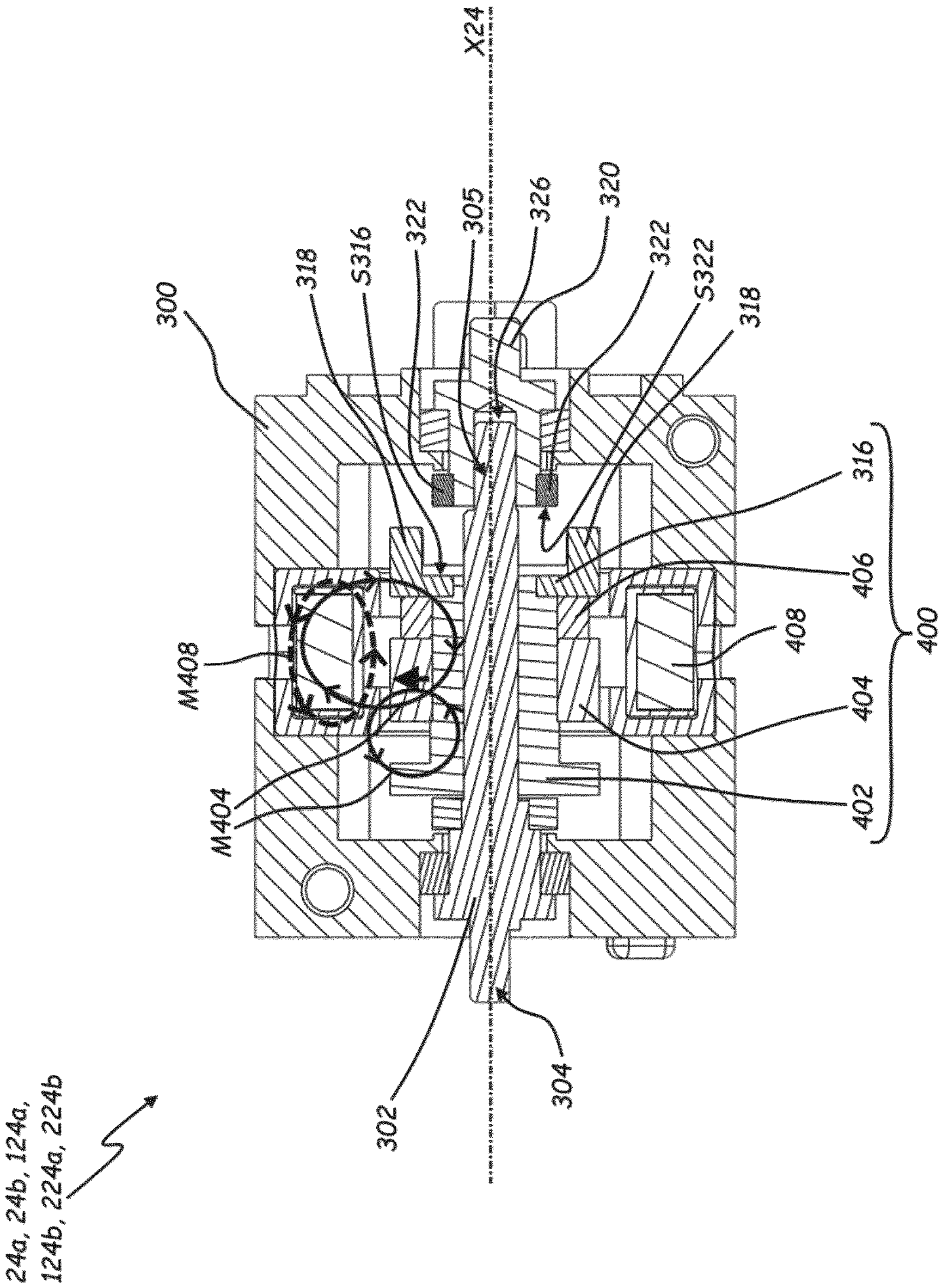
FIG. 9 is a schematic cross-sectional view of a clutch, according to a second embodiment of the invention and in a position called "disengaged" of the clutch, of the electromechanical actuator illustrated in one of FIGS. 2 to 4, according to one of the three embodiments of the invention.
Figure 10:
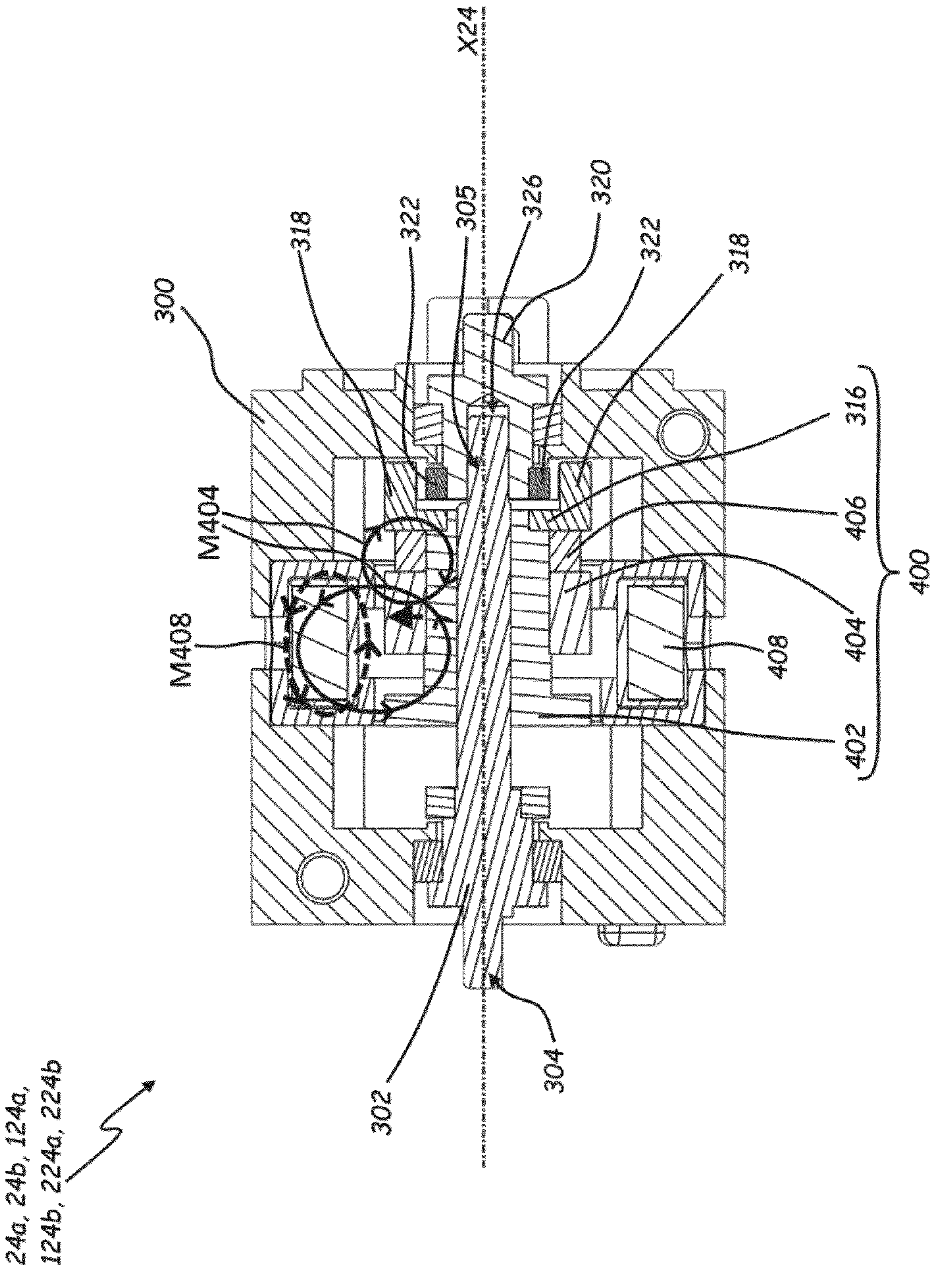
FIG. 10 is a view analogous to FIG. 9, in a position called "engaged" of the clutch.

A second example embodiment of a clutch is now described, in more detail with reference to FIGS. 9 and 10, which can be either one of the first and second clutches 24*a*, 24*b*, 124*a*, 124*b*, 224*a*, 224*b* or each of the first and second clutches 24*a*, 24*b*, 124*a*, 124*b*, 224*a*, 224*b*, illustrated in FIGS. 2 through 4.

The elements of the second example embodiment of the clutch common with the first example embodiment of the clutch of FIGS. 5 through 8 retain hereafter identical references as those used above.

According to the second example embodiment of the clutch 24*a*, 24*b*, 124*a*, 124*b*, 224*a*, 224*b*, the clutch 24*a*, 24*b*, 124*a*, 124*b*, 224*a*, 224*b* comprises the housing 300, the shaft 302, a coil 408, a shuttle 400, and a magnet 404.

Advantageously, the shuttle 400 comprises the first claw 316, a ring 402, the magnet 404 and a spacer 406.

The shuttle 400 is translatable, in other words is configured to be translatable, with respect to the housing 300, in particular along the axis X24, between a first position and a second position, in particular in the assembled configuration of the clutch 24*a*, 24*b*, 124*a*, 124*b*, 224*a*. The first position is an engaged position, in other words a "clawed" position, of the clutch 24*a*, 24*b*, 124*a*, 124*b*, 224*a*, 224*b*. Furthermore, the second position is a disengaged position, in other words an "un-clawed" position, of the clutch 24*a*, 24*b*, 124*a*, 124*b*, 224*a*, 224*b*.

In the first position of the clutch 24*a*, 24*b*, 124*a*, 124*b*, 224*a*, the first claw 316 is in contact, in other words is configured to be in contact, with the second claw 322. Furthermore, in the second position of the clutch 24*a*, 24*b*, 124*a*, 124*b*, 224*a*, the first claw 316 and the second claw 322 are not in contact, in other words are configured to not be in contact.

Advantageously, the magnet 404 is fixed with respect to the ring 402, in particular in the assembled configuration of the clutch 24*a*, 24*b*, 124*a*, 124*b*, 224*a*.

Here, the magnet 404, on the one hand, abuts against a shoulder, not shown, of the ring 402 and abuts, on the other hand, against the spacer 406.

Thus, the magnet 404 is maintained at a fixed distance from the first claw 316.

Advantageously, the magnet 404 is a radially magnetized magnet, which may be, for example, ring-shaped.

Advantageously, the magnet 404 is mounted on the ring 402 of the shuttle 400, in particular in the assembled configuration of the clutch 24*a*, 24*b*, 124*a*, 124*b*, 224*a*.

Here, the axis of symmetry of the magnet 404 is coincident with the axis X24.

The magnet 404 is configured to generate, in other words generates, a magnetic field, denoted M404, a simplified representation of which is visible in FIGS. 9 and 10.

The magnetic field M404 comprises two groups of field lines, propagating in two opposite orientations, located on either side of the magnet 404, along the axis X24.

Advantageously, the coil 408 is fixed with respect to the housing 300, that is to say is fixedly arranged inside the housing 300, in particular in the assembled configuration of the clutch 24*a*, 24*b*, 124*a*, 124*b*, 224*a*, which may be, for example, ring-shaped.

Here, the axis of symmetry of the shuttle 408 is coincident with the axis X24.

Advantageously, the shuttle 400 is housed, in other words is configured to be housed, within a central space of the coil 408, in particular in the assembled configuration of the clutch 24*a*, 24*b*, 124*a*, 124*b*, 224*a*.

As visible in FIGS. 9 and 10, in both the first position and second position of the clutch 24*a*, 24*b*, 124*a*, 124*b*, 224*a*, the magnet 404 is arranged opposite the coil 408, but is off-center with respect to the coil 408 along the axis X24, that is to say a mid-plane, not shown, of the magnet 404 and a mid-plane, not shown, of the coil 408 are not coincident.

Thus, the two field lines groups of the magnetic field M404 interact differently with the coil 408. In practice, one of the two groups of the magnetic field lines M404 is closer to the coil 408 and there is then a stronger magnetic coupling between this first group of the magnetic field lines M404 and the coil 408 than between the second group of the magnetic field lines M404 and the coil 408.

The coil 408 is configured to generate, in other words generates, a pulsating magnetic field M408, a simplified representation of which can be seen in FIGS. 9 and 10, in particular when supplied with an electric current from a generator, not shown, so as to cause the shuttle 400 to move by means of the magnet 404, between the first position and the second position, or vice versa, according to an orientation of the pulsating magnetic field M408.

In FIGS. 9 and 10, the pulsating magnetic field M408 is illustrated oriented according to a first polarity, which depends on the direction of flow of the electric current. When the direction of flow of the electric current is reversed, then the polarity of the pulsating magnetic field M408 is reversed, that is to say the field lines of the pulsating magnetic field M408 are identical but their orientation is reversed.

To switch between the second position and the first position of the clutch 24*a*, 24*b*, 124*a*, 124*b*, 224*a*, the coil 408 is supplied with a first electric current, so as to generate the pulsating magnetic field M408 in a first orientation, as illustrated in FIGS. 9 and 10.

When the coil 408 generates a pulsating magnetic field M408 according to the first orientation and the clutch 24*a*, 24*b*, 124*a*, 124*b*, 224*a* is in the second position, the pulsating magnetic field M408 of the coil 408 is opposite a first group of field lines of the magnetic field M404 of the magnet 404, corresponding to the group of field lines located closest to the coil 408, that is to say their orientations are opposite, and the pulsating magnetic field M408 is aligned with a second group of field lines of the magnetic field M404 of the magnet 404, corresponding to the group of field lines located farthest from the coil 408.

This configuration results in the coil 408, that is fixed, pushing away the first group of field lines of the magnetic filed M404 and attracting the second group of field lines of the magnetic field M404, because the pulsating magnetic field M408 of the coil 408 and the second group of field lines of the magnetic field M404 of the magnet 404 seek to align.

Thus, the magnet 404, which is translatable along the axis X24, is set in movement along the axis X24, so as to drive the entire shuttle 400. This translation continues until the contact surface S316 of the first claw 316 and the contact surface S322 of the second claw 322 come into contact, that is to say until the shuttle 400 is in the first position.

This corresponds to the transition of the clutch 24*a*, 24*b*, 124*a*, 124*b*, 224*a* from the position in FIG. 9 to the position in FIG. 10.

Since the first position is a stable position of the clutch 24*a*, 24*b*, 124*a*, 124*b*, 224*a*, once this switching is done, the power supply to the coil 408 is interrupted. In other words, an electrical pulse, that generates a pulsating magnetic field M408, is all that is required to switch from the disengaged state to the engaged state.

To switch between the first position and the second position of the clutch 24*a*, 24*b*, 124*a*, 124*b*, 224*a*, the coil 408 is supplied with a second electric current, of opposite intensity to the first electric current, so as to generate a pulsating magnetic field M408 according to a second orientation opposite to the first orientation, not shown.

In other words, if for example the first electric current has a positive intensity, then the second electric current has a negative intensity.

Thus, the pulsating magnetic field M408 generated by this second electric current is opposed to the magnetic field M404 of the magnet 404.

This opposition leads to the coil 408 pushing the magnet 404 away, so as to drive the entire shuttle 400 to the second position.

Thus, the switching between the first position and the second position of the clutch 24*a*, 24*b*, 124*a*, 124*b*, 224*a* occurs according to the same phenomena as the switching between the second position and the first position of the clutch 24*a*, 24*b*, 124*a*, 124*b*, 224*a*, but in reverse.

Since the second position is a stable position of the clutch 24*a*, 24*b*, 124*a*, 124*b*, 224*a*, once this switching is done, the power supply to the coil 408 is interrupted. In other words, an electrical pulse, that generates a pulsating magnetic field M408, is all that is required to switch from the engaged state to the disengaged state.

A high end-of-travel position is defined, in the installation I, as corresponding to a position in which the top bar 8*a* cannot move up, in particular by approaching the housing 3 and, optionally, the electromechanical actuator 10, 110, 210, in the case of the electromechanical actuator 10, 110, 210 is arranged inside the housing 3. The high end-of-travel position can either be predetermined or correspond to the top bar 8*a* bearing against the housing 3. Furthermore, a low end-of-travel position is defined, in the installation I, as corresponding to a position in which the bottom bar 8*b* cannot move down, in particular away from the housing 3 and, optionally, from the electromechanical actuator 10, 110, 210, in the case of the electromechanical actuator 10, 110, 210 is arranged inside the housing 3 or the top bar 8*a*. The low end-of-travel position can be either predetermined or correspond to the bottom bar 8*b* bearing against a threshold of the opening O or correspond to the complete unwinding of the screen 6.

A first control point, in this case the remote control 500, belonging to the installation I is now described, in more detail and with reference to FIG. 11.

The remote control 500 is a local command unit configured to communicate, in other words communicating, with the control unit 20, via its second communication module, so as to transmit command orders to the first communication module of the control unit 20.

The communication between the first and second communication modules of the remote control 500 and the control unit 20 is, preferably, wireless. This communication may be mono- or bi-directional.

The remote control 500 comprises at least a housing 502, a first selection element 504, which may also be referred to as "up" button, a second selection element 510, which may also be referred to as "down" button, a third selection element 506, which may also be referred to as "thumbwheel". The third selection element 506 is configured to be driven in rotational or linear movement with respect to the housing 502.

Advantageously, the remote control 500 may further comprise a fourth selection element 508, which may also be referred to as "stop" button.

Here and as illustrated in FIG. 11, the fourth selection element 508 is arranged in the center of the third selection element 506.

Advantageously, the third selection element 506 may be either a ring that is rotatable with respect to the housing 502, especially clockwise or counterclockwise, or a slider that is translatable with respect to the housing 502.

Each of the first, second, third and, optionally, fourth selection elements 504, 510, 506, 508 is configured to transmit, in other words transmits, a control signal to the control unit 20, via the first and second communication modules.

A first implementation of an embodiment of the installation I with the remote control 500 is now described.

The first and second selection elements 504, 510 are configured to control, in other words control, respectively an upward movement and a downward movement of the bottom bar 8*b*.

A press on the first selection element 504 triggers an upward movement of the bottom bar 8*b*, in particular towards the housing 3, by means of the electromechanical actuator 10, 110, 210.

Advantageously, if, during the upward movement of the bottom bar 8*b*, the latter comes into contact with the top bar 8*a*, then the top bar 8*a* is also set in movement towards the housing 3, in particular at the same speed as the bottom bar 8*b*, by means of the electromechanical actuator 10, 110, 210, so as to move up with the bottom bar 8*b*.

Advantageously, the upward movement of the bottom bar 8*b* and the top bar 8*a* continues either until the fourth selection element 508 is pressed or until the top bar 8*a* reaches the high end-of-travel position.

Advantageously, if when the first selection element 504 is pressed the bottom bar 8*b* is in contact with the top bar 8*a* and the top bar 8*a* is in the high end-of-travel position, then pressing the first selection element 504 does not trigger any movement of the bottom bar 8*b* or the top bar 8*a*, by means of the electromechanical actuator 10, 110, 210.

A press on the second selection element 510 triggers a downward movement of the bottom bar 8*b*, in particular away from the housing 3, by means of the electromechanical actuator 10, 110, 210.

Advantageously, the downward movement of the bottom bar 8*b* continues either until the fourth selection element 508 is pressed or until the bottom bar 8*b* reaches the low end-of-travel position.

Advantageously, in the case of pressing on the second selection element 510 during the upward movement of the bottom bar 8*b*, the upward movement of the bottom bar 8*b* is interrupted and a downward movement of the bottom bar 8*b* is triggered, by means of the electromechanical actuator 10, 110, 210.

Similarly, in the case of pressing on the first selection element 504 during the downward movement of the bottom bar 8*b*, the downward movement of the bottom bar 8*b* is interrupted and an upward movement of the bottom bar 8*b* is triggered, by means of the electromechanical actuator 10, 110, 210.

The third selection element is configured to control an upward movement and a downward movement of the top bar 8*a*.

Advantageously, a movement of the third selection element 506 in a first direction greater than or equal to a first predetermined value, especially a clockwise rotation of the thumbwheel by at least 360 degrees, triggers an upward movement of the top bar 8*a*, in particular to the high end-of-travel position. Such an upward movement may also be referred to as full upward movement.

Advantageously, the upward movement of the top bar 8*a* continues either until the fourth selection element 508 is pressed or until the top bar 8*a* reaches the high end-of-travel position.

Advantageously, a movement of the third selection element 506 in the first direction less than the first predetermined value, in particular a clockwise rotation of the thumbwheel by less than 360 degrees, triggers a partial upward movement of the top bar 8*a*, in particular either by a predetermined distance or to a predetermined intermediate position, the predetermined intermediate position being located between the high end-of-travel position and the low end-of-travel position, for example by a percentage of a height of the opening O or by a value expressed in centimeters.

Advantageously, the partial upward movement of the top bar 8*a* continues either until the fourth selection element 508 is pressed or until the top bar 8*a* reaches the high end-of-travel position or when the third selection element 506 is moved in a second direction, the second direction being opposite to the first direction, especially a rotation of the thumbwheel in the counterclockwise direction.

Similarly, a movement of the third selection element 506 in the second direction greater than or equal to a second predetermined value, wherein the second predetermined value may be the same as or different from the first predetermined value, especially a counterclockwise rotation of the thumbwheel by at least 360 degrees, triggers a downward movement of the top bar 8*a*, in particular towards the low end-of-travel position. Such a downward movement may also be referred to as full downward movement.

Advantageously, if, during the downward movement of the top bar 8*a* the latter comes into contact with the bottom bar 8*b*, then the bottom bar 8*b* is also set in movement away from the housing 3, in particular at the same speed as the top bar 8*a*, by means of the electromechanical actuator 10, 110, 210, so as to move down with the top bar 8*a*.

Advantageously, the downward movement of the bottom bar 8*b* and the top bar 8*a* continues either until the fourth selection element 508 is pressed or until the bottom bar 8*b* reaches the low end-of-travel position.

Advantageously, a movement of the third selection element 506 in the second direction less than the second predetermined value, especially a counterclockwise rotation of the thumbwheel by less than 360 degrees, triggers a partial downward movement of the top bar 8*a*, in particular either by a predetermined distance or to a predetermined intermediate position, the predetermined intermediate position being located between the high end-of-travel position and the low end-of-travel position, for example by a percentage of the height of the opening O or by a value expressed in centimeters.

Advantageously, the partial downward movement of the top bar 8*a* continues either until pressing on the fourth selection element 508 or as soon as the top bar 8*a* comes into contact with the bottom bar 8*b* or when the third selection element 506 is moved in the first direction.

A second implementation of an embodiment of the installation I with the remote control 500 is now described.

Here, the first and second selection elements 504, 510 are configured to control, in other words controls, respectively an upward movement and a downward movement of the bottom bar 8*b* or the top bar 8*a*.

Furthermore, the third selection element 506 is configured to control, in other words controls, simultaneously an upward movement of the top bar 8*a* and the bottom bar 8*b* or a downward movement of the top bar 8*a* and the bottom bar 8*b*.

Thus, a movement of the third selection element 506 in a first direction, especially a clockwise rotation of the thumbwheel, triggers a simultaneous downward movement of the top bar 8*a* and the bottom bar 8*b*.

In this way, the movement of the third selection element 506 in the first direction causes a movement of the screen 6 away from the housing 3, without the occultation area S by the screen 6 varying.

Advantageously, if the movement of the third selection element 506 in the first direction is greater than or equal to a first predetermined value, especially a rotation of the thumbwheel of at least 360 degrees, then the downward movement continues without interruption, in particular to the bottom end-of-travel position. Such a downward movement may also be referred to as full downward movement.

Advantageously, if the movement of the third selection element 506 in the first direction is less than the first predetermined value, especially a rotation of the thumbwheel of less than 360 degrees, then the downward movement of the screen 6 is partial, in particular either by a predetermined distance or to a predetermined intermediate position, the predetermined intermediate position being located between the high end-of-travel position and the low end-of-travel position, for example by a percentage of the height of the opening O or by a value expressed in centimeters.

Advantageously, the downward movement, complete or partial, continues either until the fourth selection element 508 is pressed or until the bottom bar 8*b* reaches the low end-of-travel position or when the third selection element 506 is moved in a second direction, the second direction being opposite to the first direction.

Similarly, a movement of the third selection element 506 in the second direction, especially a counterclockwise rotation of the thumbwheel, triggers a simultaneous upward movement of the top bar 8*a* and the bottom bar 8*b*.

In this way, the movement of the third selection element 506 in the second direction causes a movement of the screen 6 towards the housing 3, without the occultation area S by the screen 6 varying.

Advantageously, if the movement of the third selection element 506 in the second direction is greater than or equal to a second predetermined value, wherein the second predetermined value may be the same as or different from the first predetermined value, especially a rotation of the thumbwheel of at least 360 degrees, then the upward movement continues without interruption, in particular to the high end-of-travel position. Such an upward movement may also be referred to as full upward movement.

Advantageously, if the movement of the third selection element 506 in the second direction is less than the second predetermined value, especially a rotation of the thumbwheel of less than 360 degrees, then the upward movement of the screen 6 is partial, in particular either by a predetermined distance or to a predetermined intermediate position, the predetermined intermediate position being located between the high end-of-travel position and the low end-of-travel position, for example by a percentage of the height of the opening O or by a value expressed in centimeters.

Advantageously, the upward movement, complete or partial, continues either until the fourth selection element 508 is pressed or until the top bar 8*a* reaches the high end-of-travel position or when the third selection element 506 is moved in the first direction.

Advantageously, a long press on the fourth selection element 508 triggers a movement of the screen 6 to a pre-registered preferred position in the control unit 20. A long press means a continuous press on the fourth selection element 508 for a period of time greater than or equal to a predetermined threshold value, which may be, for example, one second. The pre-registered preferred position in the control unit 20 of the screen 6 corresponds to a pre-registered preferred position of the top bar 8*a* and a pre-registered preferred position of the bottom bar 8*b*.

Advantageously, the movement of the screen 6 triggered by a long press on the fourth selection element 508 corresponds to a successive movement, that is to say sequential movement, of the top bar 8*a* and then the bottom bar 8*b*, or to a successive movement, that is to say sequential movement, of the bottom bar 8*b* and then the top bar 8*a*, each bar being set either in an upward movement or in a downward movement, to reach its pre-registered preferred position. Preferably, the first bar sets in movement among the top bar 8*a* and the bottom bar 8*b* corresponds to the bar closest to its pre-registered preferential position.

Advantageously, the movement of the screen 6 triggered by a long press on the fourth selection element 508 is calculated by the control unit 20 so that the movement time of the screen 6 is minimized, that is to say the sequence of movements of the top bar 8*a* and the bottom bar 8*b* is chosen to reduce the movement time of the screen 6.

Advantageously, the movement of the screen 6 triggered by a long press on the fourth selection element 508 corresponds to a simultaneous movement of the top bar 8*a* and the bottom bar 8*b*, with each bar moved either upward or downward, to reach its pre-registered preferred position. Furthermore, when a first bar among the top bar 8*a* and the bottom bar 8*b* reaches its pre-registered preferred position, the second bar continues its upward or downward movement until it reaches its pre-registered preferred position.

A second control point, in this case the wall-mounted control point 600, belonging to the installation I, is now described, in more detail and with reference to FIG. 12.

The wall-mounted control point 600 is a local command unit configured to communicate, in other words communicates, with the control unit 20, by means of its second communication module, so as to transmit command orders to the first communication module of the control unit 20, in a manner comparable to the remote control 500.

The wall-mounted control point 600 comprises at least a first selection element 604, which may also be referred to as "up" button, a second selection element 608, which may also be referred to as "down" button, a third selection element 610 and a fourth selection element 612.

The wall-mounted control point 600 further comprises a housing 602.

Advantageously, the wall-mounted control point 600 may further comprise a fifth selection element 606, which may also be referred to as "stop" button.

The third selection element 610 is configured to activate or deactivate a first operating mode of the installation I.

Advantageously, the first selection element 610 is associated with a first light source, not shown, such as, for example, a light-emitting diode. Furthermore, the first light source is configured to be on, in other words is on, when the first operating mode of the installation I is activated and is configured to be off, in other words is off, when the first operating mode of the installation I is deactivated.

The fourth selection element 612 is configured to activate or deactivate a second operating mode of the installation I.

Advantageously, the fourth selection element 612 is associated with a second light source, not shown, such as, for example, a light emitting diode. Furthermore, the second light source is configured to be on, in other words is on, when the second operating mode of the installation I is activated and is configured to be off, in other words is off, when the second operating mode of the installation I is deactivated.

The first and second operating modes of the installation I can be activated simultaneously.

When only the first operating mode of the installation I is activated, the first and second selection elements 604, 608 are configured to control respectively an upward movement and a downward movement of the top bar 8*a*.

Advantageously, the first selection element 604 triggers an upward movement of the top bar 8*a* either until the fifth selection element 606 is pressed or until the top bar 8*a* reaches the high end-of-travel position.

Advantageously, in the case of pressing on the second selection element 608 during the upward movement of the top bar 8*a*, the upward movement of the top bar 8*a* is interrupted and a downward movement of the top bar 8*a* is triggered, by means of the electromechanical actuator 10, 110, 210.

Advantageously, if, during the downward movement of the top bar 8*a* the latter comes into contact with the bottom bar 8*b*, then the bottom bar 8*b* is also set in movement away from the housing 3, in particular at the same speed as the top bar 8*a*, by means of the electromechanical actuator 10, 110, 210, so as to move down with the top bar 8*a*.

Advantageously, the second selection element 608 triggers a downward movement of the top bar 8*a* either until pressing on the fifth selection element 606 or until the bottom bar 8*b* reaches the low end-of-travel position.

Advantageously, in the case of pressing on the first selection element 604 during the downward movement of the top bar 8*a*, the downward movement of the top bar 8*a* is interrupted and an upward movement of the top bar 8*a* is triggered, by means of the electromechanical actuator 10, 110, 210.

When only the second operating mode of the installation I is activated, the first and second selection elements 604, 608 are configured to control respectively an upward movement and a downward movement of the bottom bar 8*b*, in a similar manner as when these are configured to control respectively an upward movement and a downward movement of the top bar 8*a* in the case when the first operating mode of the installation I is activated.

When the first and second operating modes of the installation I are activated simultaneously, the first and second selection elements 604, 608 are configured to control respectively an upward movement and a downward movement simultaneous of the top bar 8*a* and the bottom bar 8*b*.

Thus, a press on the second selection element 608 triggers a simultaneous downward movement of the top bar 8*a* and the bottom bar 8*b*.

In this way, pressing the second selection element 608 causes a movement of the screen 6 away from the housing 3, without the occultation area S by the screen 6 varying.

Advantageously, the downward movement continues either until the fifth selection element 606 is pressed or until the bottom bar 8*b* reaches the low end-of-travel position or when the first selection element 604 is pressed.

Similarly, a press on the first selection element 604 triggers a simultaneous upward movement of the top bar 8*a* and the bottom bar 8*b*.

In this way, pressing the first selection element 604 causes a movement of the screen 6 towards the housing 3, without the occultation area S by the screen 6 varying.

Advantageously, the upward movement continues either until the fifth selection element 606 is pressed or until the top bar 8*a* reaches the high end-of-travel position or when the second selection element 604 is pressed.

Advantageously, regardless of the activated operating mode, a long press on the fifth selection element 606 triggers a movement of the screen 6 to a pre-registered preferred position in the control unit 20. A long press means a continuous press on the fifth selection element 606 for a period of time greater than or equal to a predetermined threshold value, which may be, for example, one second. The pre-registered preferred position in the control unit 20 of the screen 6 corresponds to a pre-registered preferred position of the top bar 8*a* and a pre-registered preferred position of the bottom bar 8*b*.

Advantageously, the movement of the screen 6 triggered by a long press on the fourth selection element 508 corresponds to a successive movement, that is to say sequential movement, of the top bar 8*a* and then the bottom bar 8*b*, or to a successive movement, that is to say sequential movement, of the bottom bar 8*b* and then the top bar 8*a*, with each bar being set either in an upward movement or in a downward movement, to reach its pre-registered preferred position. Preferably, the first bar sets in movement among the top 8*a* and the bottom bar 8*b* bar corresponds to the bar closest to its pre-registered preferential position.

Advantageously, the movement of the screen 6 triggered by a long press on the fourth selection element 508 is calculated by the control unit 20 so that the movement time of the screen 6 is minimized, that is to say the sequence of movements of the top bar 8*a* and the bottom bar 8*b* is chosen to reduce the movement time of the screen 6.

Advantageously, the movement of the screen 6 triggered by a long press on the fourth selection element 508 corresponds to a simultaneous movement of the top bar 8*a* and the bottom bar 8*b*, each bar being moved either upward or downward, to reach its pre-registered preferred position. Furthermore, when a first bar among the top bar 8*a* and the bottom bar 8*b* reaches its pre-registered preferred position, the second bar continues its upward or downward movement until it reaches its pre-registered preferred position.

The remote control 500 and the wall-mounted control point 600 may be used within the installation I comprising one or more electromechanical actuators 10 according to the first embodiment, as well as within the installation I comprising one or more electromechanical actuators 110, 210 according to either one of the second and third embodiments or to the second and third embodiments.

Regardless of the embodiment, the installation I may incorporate the remote control 500 or the wall-mounted control point 600, or one or more other local command units, not shown, or the remote control 500 and the wall-mounted control point 600 and, optionally, one or more other local command units.

In a variant, not shown, the electromechanical actuator 10, 110, 210 may be mounted inside the top 8*a* or the bottom bar 8*b*, instead of being mounted inside the housing 3. In such a case, the occultation or solar protection device 4 may be without the housing 3.

The above-mentioned embodiments and variants can be combined to generate new embodiments, without departing from the scope of the invention defined by the claims.

The invention claimed is:

1. An occultation or solar protection installation comprising at least one occultation or solar protection device including:

a screen, a top bar, a bottom bar, a top winding shaft, a bottom winding shaft, and an electromechanical actuator, the screen being disposed between the top and bottom bars, the top bar being connected to the top winding shaft via first cords, and the bottom bar being connected to the bottom winding shaft via second cords, the electromechanical actuator comprising:

a single electric motor configured to drive the top and bottom winding shafts of the occultation or solar protection device, the top winding shaft being coaxial with the bottom winding shaft;

a first transmission device connected to the single electric motor and connected to the top winding shaft of the occultation or solar device when the protection electromechanical actuator engages the occultation or solar protection device, the first transmission device comprising a first clutch; and a second transmission device connected to the single electric motor and connected to the bottom winding shaft of the occultation or solar protection device when the electromechanical actuator engages the occultation or solar protection device, the second transmission device comprising a second clutch;

wherein, when the single electric motor is electrically activated and only one of the first and second clutches is engaged, only one of the first and second transmission devices is respectively activated to cause only one of the top and bottom winding shafts to be rotated by the single electric motor, and wherein, when the single electric motor is electrically activated and the first and second clutches are engaged, the first and second transmission devices are respectively activated to cause the top and bottom winding shafts to be rotated by the single electric motor.

2. The occultation or solar protection installation according to claim 1, wherein the electromechanical actuator is configured to move each of the top and bottom bars separately or simultaneously, the occultation or solar protection installation further comprising at least one control point comprising:

a housing, a first selector, a second selector, and a third selector configured to be rotatably or linearly movable with respect to the housing, wherein the first and second selectors are configured to respectively control an upward movement and a downward movement of the bottom bar, and the third selector is configured to control an upward movement and a downward movement of the top bar.

3. The occultation or solar protection installation according to claim 1, wherein the electromechanical actuator is configured to move each of the top and bottom bars separately or simultaneously, the occultation or solar protection installation further comprising at least one control point comprising:

a housing, a first selector, a second selector, and a third selector configured to be rotatably or linearly movable with respect to the housing, wherein the first and second selectors are configured to control respectively control an upward movement and a downward movement of the bottom bar or the top bar, and the third selector is configured to simultaneously control an upward movement of the top bar and the bottom bar or a downward movement of the top bar and the bottom bar.

4. The occultation or solar protection installation according to claim 1, wherein the electromechanical actuator is configured to move each of the top and bottom bars separately or simultaneously, the occultation or solar protection installation further comprising at least one control point comprising:

a first selector, a second selector, a third selector configured to activate or deactivate a first operating mode of the occultation or solar installation, and a fourth selector configured to activate or deactivate a second operating mode of the occultation or solar installation, wherein, when only the first operating mode of the occultation or solar installation is activated, the first and second selectors are configured to respectively control an upward movement and a downward movement of the top bar, when only the second operating mode of the occultation or solar installation is activated, the first and second selectors are configured to respectively control an upward movement and a downward movement of the bottom bar, and when the first and second operating modes of the occultation or solar installation are simultaneously activated, the first and second selectors are configured to respectively control an upward movement and a downward movement simultaneously of the top bar and the bottom bar.

* * * * *